(12) United States Patent
Kajita et al.

(10) Patent No.: US 6,922,159 B2
(45) Date of Patent: Jul. 26, 2005

(54) APPARATUS AND METHOD FOR DECODING

(75) Inventors: Kuniyuki Kajita, Yokohama (JP); Takashi Toda, Ishikawa (JP); Hidetoshi Suzuki, Yokosuka (JP); Masatoshi Watanabe, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/793,766

(22) Filed: Mar. 8, 2004

(65) Prior Publication Data

US 2004/0174941 A1 Sep. 9, 2004

Related U.S. Application Data

(63) Continuation of application No. 10/221,267, filed as application No. PCT/JP02/00632 on Jan. 29, 2002, now Pat. No. 6,734,810.

(30) Foreign Application Priority Data

| Jan. 31, 2001 | (JP) | 2001-23713 |
| Feb. 8, 2001 | (JP) | 2001-31850 |
| Feb. 22, 2001 | (JP) | 2001-46559 |

(51) Int. Cl.[7] .......................... H03M 7/00; G06F 7/00; G06F 15/00
(52) U.S. Cl. ........................... 341/50; 708/205
(58) Field of Search ..................... 341/50; 708/205, 708/204, 497, 530; 342/378; 375/141, 377; 382/293

(56) References Cited

U.S. PATENT DOCUMENTS

| 3,710,323 | A | * | 1/1973 | Andrews et al. | 382/293 |
| 3,831,012 | A | * | 8/1974 | Tate et al. | 708/205 |
| 4,528,640 | A | * | 7/1985 | Criswell | 708/530 |
| 4,779,220 | A | * | 10/1988 | Nukiyama | 708/497 |
| 4,794,557 | A | * | 12/1988 | Yoshida et al. | 708/205 |
| 4,875,180 | A | * | 10/1989 | Kregness et al. | 708/204 |
| 4,926,370 | A | * | 5/1990 | Brown et al. | 708/497 |
| 5,075,882 | A | * | 12/1991 | Sakai et al. | 708/205 |
| 5,241,490 | A | * | 8/1993 | Poon | 708/205 |

(Continued)

FOREIGN PATENT DOCUMENTS

| EP | 975096 | 1/2000 |
| GB | 2301999 | 12/1996 |

(Continued)

OTHER PUBLICATIONS

International Search Report dated Mar. 19, 2002.
"3GPP TS 25.212 v 3.10.1 (2002–06)", Technical Specification, 3$^{rd}$ Generation Partnership Project; Technical Specification Group Radio Access Network; Multiplexing and Channel Coding (FDD), (Release 1999), Jun. 2002.

*Primary Examiner*—Patrick Wamsley
(74) *Attorney, Agent, or Firm*—Stevens, Davis, Miller & Mosher, LLP

(57) ABSTRACT

Coding section 205 recodes decoded data stored in decoded data storage section 204, data conversion section 206 converts data "0" and "1" output from coding section 205 to "1" and "–1" respectively, sum-of-product calculation section 207 multiplies the data output from data conversion section 206 by the demodulated data (soft decision value) stored in demodulated data storage section 201 and then calculates the sum of the products for 1 TTI and stores the sum-of-product result for each data rate, data rate decision section 208 decides the data rate corresponding to a maximum value of the sum-of-product results as the data rate of the demodulated data. This makes it possible to improve the accuracy of data rate decision and reduce decoding errors of a received signal.

14 Claims, 20 Drawing Sheets

U.S. PATENT DOCUMENTS

| | | | |
|---|---|---|---|
| 5,311,543 A | | 5/1994 | Schreiber |
| 5,867,407 A | * | 2/1999 | Wolrich et al. ............ 708/205 |
| 5,978,428 A | | 11/1999 | Hayashi |
| 6,670,919 B2 | * | 12/2003 | Yoshida ...................... 342/378 |
| 6,734,810 B2 | * | 5/2004 | Kajita et al. .................. 341/50 |

FOREIGN PATENT DOCUMENTS

| | | |
|---|---|---|
| JP | 07038620 | 2/1995 |
| JP | 07046146 | 2/1995 |
| JP | 09074404 | 3/1997 |
| JP | 11163961 | 6/1999 |
| JP | 11163962 | 6/1999 |
| JP | 11261523 | 9/1999 |
| JP | 2000078028 | 3/2000 |
| JP | 2000078110 | 3/2000 |
| WO | 9941847 | 8/1999 |

* cited by examiner

| CHANNEL ID | Ch0 | Ch1 | Ch2 | Ch3 |
|---|---|---|---|---|
| [PARAMETER GROUP B]<br>CODING TYPE<br>NUMBER OF CODE BLOCKS<br>NUMBER OF CRC BITS | CONVOLUTIONAL<br>0or1<br>12 | CONVOLUTIONAL<br>0or1<br>0 | CONVOLUTIONAL<br>0or1<br>0 | CONVOLUTIONAL<br>0or1<br>16 |
| [PARAMETER GROUP C2]<br>TTI<br>NUMBER OF CANDIDATE DATA RATES<br>CANDIDATE ID | 20ms<br>3<br>TF0~TF2 | 20ms<br>2<br>TF0,1 | 20ms<br>2<br>TF0,1 | 40ms<br>2<br>TF0,1 |
| [PARAMETER GROUP C1]<br>NUMBER OF COMBINATIONS 6 | | | | |
| DATA RATE COMBINATION TABLE | TF0<br>TF0<br>TF1<br>TF1<br>TF2<br>TF2 | TF0<br>TF0<br>TF0<br>TF0<br>TF1<br>TF1 | TF0<br>TF0<br>TF0<br>TF0<br>TF1<br>TF1 | TF0<br>TF1<br>TF0<br>TF1<br>TF0<br>TF1 |

APPARATUS AND METHOD FOR DECODING

This is a continuation of application Ser. No. 10/221,267 filed Sep. 10, 2002, which is now a U.S. Pat. No. 6,734,810, and is a related application of another continuation of application Ser. No. 10/221,267 filed concurrently herewith which is a national stage 371 PCT/JP02/00632 filed Jan. 29, 2002.

TECHNICAL FIELD

The present invention relates to an apparatus and method for decoding.

BACKGROUND ART

A third-generation mobile communication system carries out (1) RAKE combining processing, (2) physical channel decoding processing and (3) transport channel decoding processing, in that order, and then carries out error correcting decoding processing. The RAKE combining processing refers to processing of separating a received signal in which preceding waveforms and delayed waveforms affected by independent fading variations with different delay times in a multipath transmission path are superimposed on one another into the preceding waveforms and delayed waveforms, assigning weights to the waveforms with a uniform delay time and performing a maximum-ratio combining and it is intended to obtain a diversity effect. On the other hand, the physical channel decoding processing refers to processing of carrying out in-frame deinterleaving, etc. on a signal for each RAKE-combined physical channel data string and dividing the signal into transport channels. The transport channel decoding processing is processing of carrying out deinterleaving, rate matching and error correcting decoding on signals of divided transport channel data strings over a plurality of frames.

For a radio communication system, it is important to reduce decoding errors of a received signal to improve communication quality.

DISCLOSURE OF INVENTION

It is an object of the present invention to provide a decoding apparatus and decoding method capable of reducing decoding errors in a received signal in a third-generation mobile communication system.

This object is attained by calculating a reference number of shifts by averaging the number of shifts, adaptively fitting the amplitude width of a data string to be normalized within an effective bit width and deciding a data rate with the highest likelihood among a plurality of types of candidate data rates as a correct data rate of demodulated data.

BRIEF DESCRIPTION OF DRAWINGS

FIG. 20 illustrates an example of a parameter value of each channel detected by the decoding apparatus according to Embodiment 12 of the present invention.

BEST MODE FOR CARRYING OUT THE INVENTION

With reference now to the attached drawings, embodiments of the present invention will be explained below.

(Embodiment 1)

Embodiment 1 will describe a decoding apparatus and decoding method capable of preventing underflow even if normalization processing is performed in a high-speed fading environment and demonstrating high error correcting efficiency by adaptively fitting an amplitude width of data string to be normalized within an effective bit width.

By the way, "normalization" refers to processing of allowing a plurality of data strings expressed by different indices to have a common index.

(1) RAKE combining processing, (2) physical channel decoding processing and (3) transport channel decoding processing differ from one another in the processing unit. When Viterbi decoding or turbo decoding is performed for error correcting decoding, if indices of a received data string are not the same, an estimated probability density function is different from an actual signal distribution and likelihood between bits is not obtained correctly and thereby the error correcting efficiency deteriorates. It is therefore necessary to use a common processing unit (index) to prevent the error correcting decoding performance from deteriorating.

That is, since the processing unit of RAKE combining processing is a slot and the processing unit of physical channel decoding processing is a frame, it is necessary to normalize indices of the received data string in each slot within a frame after RAKE combining processing and before starting physical channel decoding processing. Likewise, the processing unit of physical channel decoding processing is a frame and the processing unit of transport channel decoding processing is TTI (Transmit Time Interval), and therefore, it is necessary to normalize indices of the received data string in each frame between frames in the TTI before starting transport channel decoding processing. However, since the TTI is any one of 1, 2, 4 or 8 frames, if the TTI is 1 frame, there is no need to perform normalization between frames.

By the way, in-frame normalization should be performed before in-frame deinterleaving. This is because after the sequence of slot data strings is changed, it is necessary to perform inefficient normalization processing such as storing the number of shifts for each piece of data. Likewise, inter-frame normalization should be performed before inter-frame deinterleaving.

Furthermore, a third-generation mobile communication system performs error correcting decoding processing by hardware or software with a limited bit length, and therefore normalization processing is processing indispensable when there are restrictions on the bit length. Restrictions on the bit length are imposed by extracting part of a received data string that corresponds to a predetermined bit position.

Figure 1:
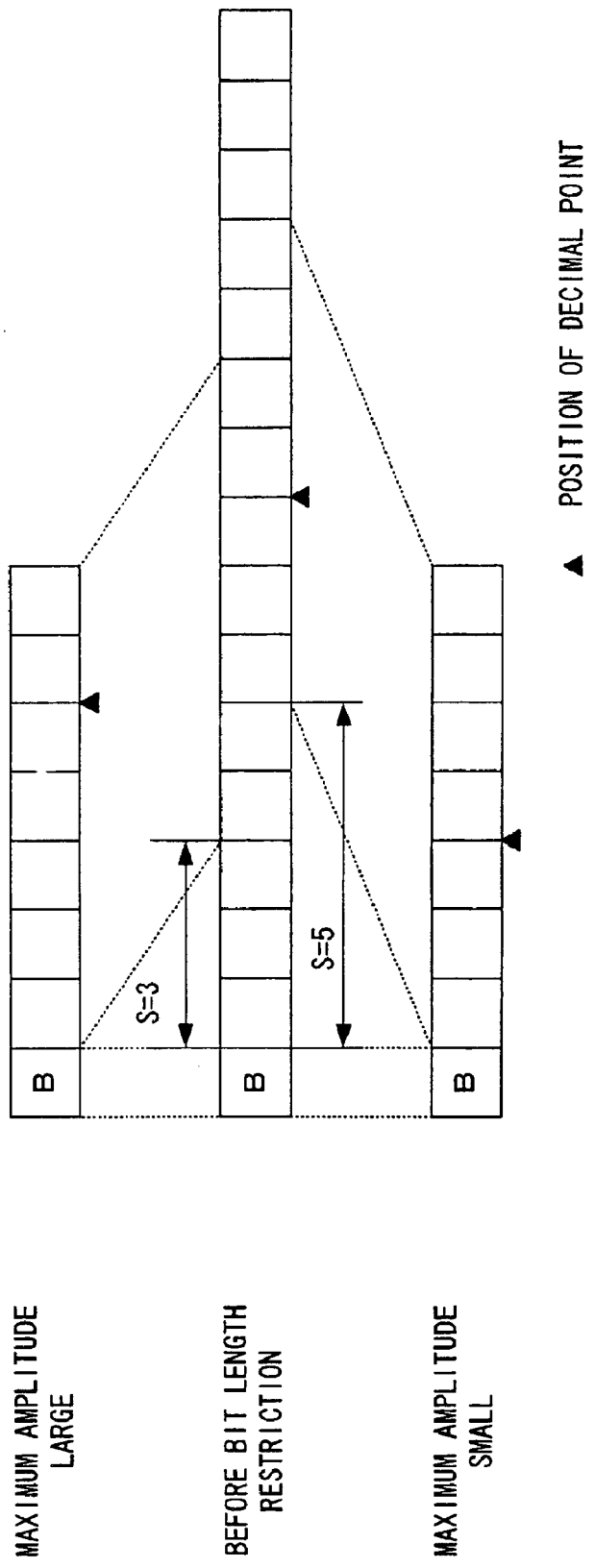
FIG. 1 illustrates restrictions on a bit length.

FIG. 1 illustrates restrictions on a bit length. FIG. 1 shows a case where the bit length of data expressed with 16 bits is restricted to 8 bits.

When a maximum amplitude is large, the extraction position is shifted upward (toward a higher value) with respect to the position of the decimal point. For example, in the case of FIG. 1, the number of shifts S is 3 and a code bit (B in FIG. 1), 5 digits of the integral part, 2 digits of the decimal part (+31.75 to −32.0) are extracted. On the contrary, when the maximum amplitude is small, the extraction position is shifted downward with respect to the position of the decimal point. For example, in the case of FIG. 1, the number of shifts S is 5 and a code bit, 3 digits of the integral part, 4 digits of the decimal part (+7.9325 to −8.0) are extracted.

Figure 2:
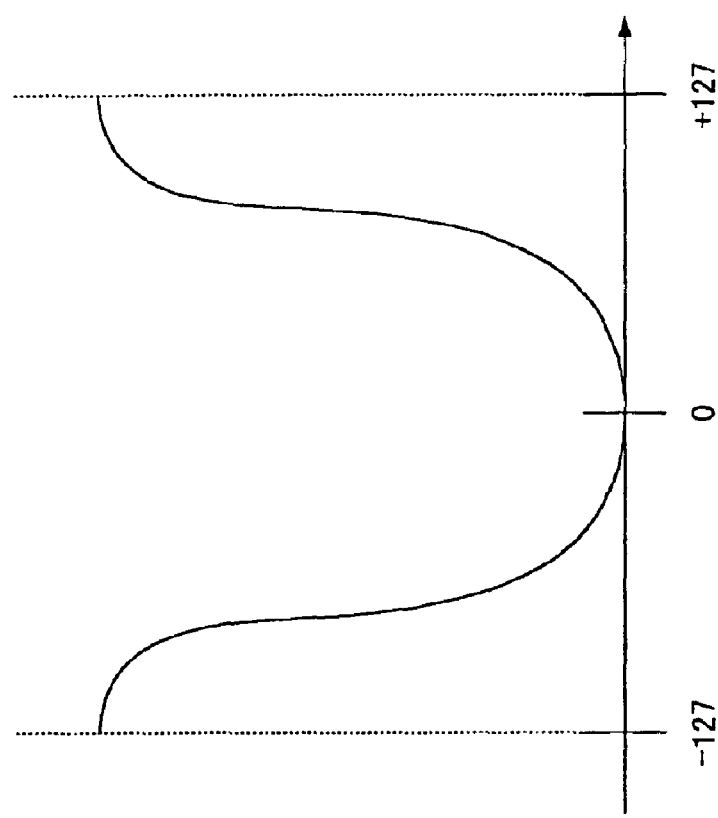
FIG. 2 illustrates an amplitude distribution when high error correcting efficiency is provided.

FIG. 2 illustrates a case where the bit length of output data after RAKE combining processing is restricted to 8 bits after normalization and shows an amplitude distribution when high error correcting efficiency is provided. In FIG. 2, the horizontal axis expresses an amplitude value and the vertical axis expresses an amount of distribution. As shown in FIG. 2, in the case where normalization is performed and the bit length is restricted to 8 bits, an amplitude distribution when the error correcting efficiency is high shows a normal distribution with the amount of distribution reaching a maximum at amplitude values of "−127" and "+127" and the amount of distribution reaching nearly 0 at an amplitude value of "0".

Figure 3:
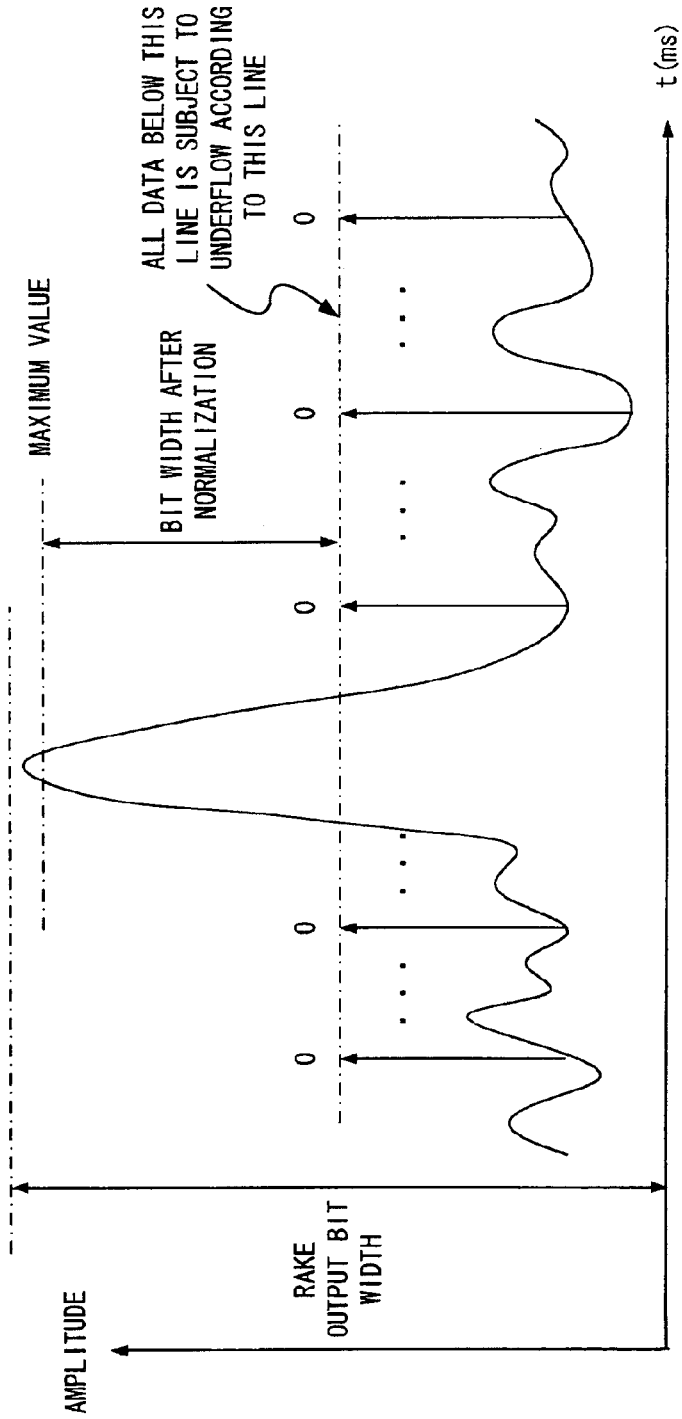
FIG. 3 illustrates an example of time-amplitude response of output data after RAKE combining processing.
Figure 4:
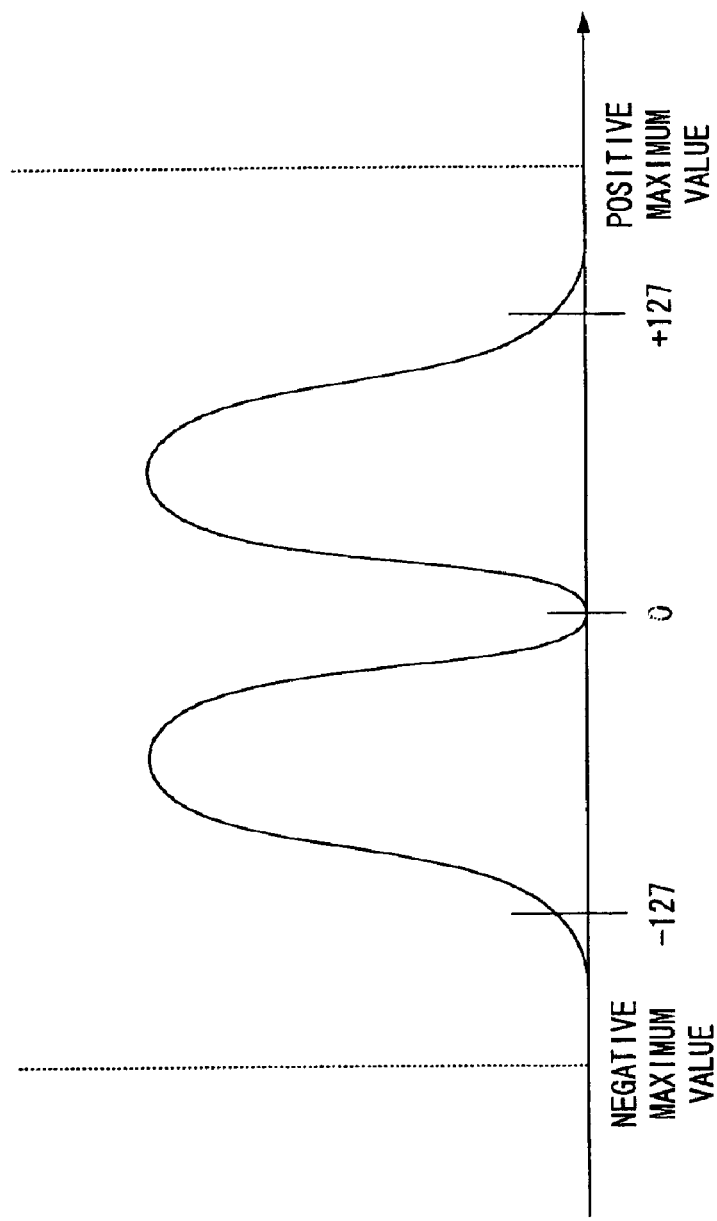
FIG. 4 illustrates an amplitude distribution before normalization of output data after the RAKE combining processing in FIG. 3.

FIG. 3 illustrates an example of time-amplitude response of output data after RAKE combining processing and shows a case where an amplitude value at timing t1 is extremely larger than amplitude values at other timings. FIG. 4 illustrates an amplitude distribution before normalization of output data after the RAKE combining processing in FIG. 3.

Figure 5:
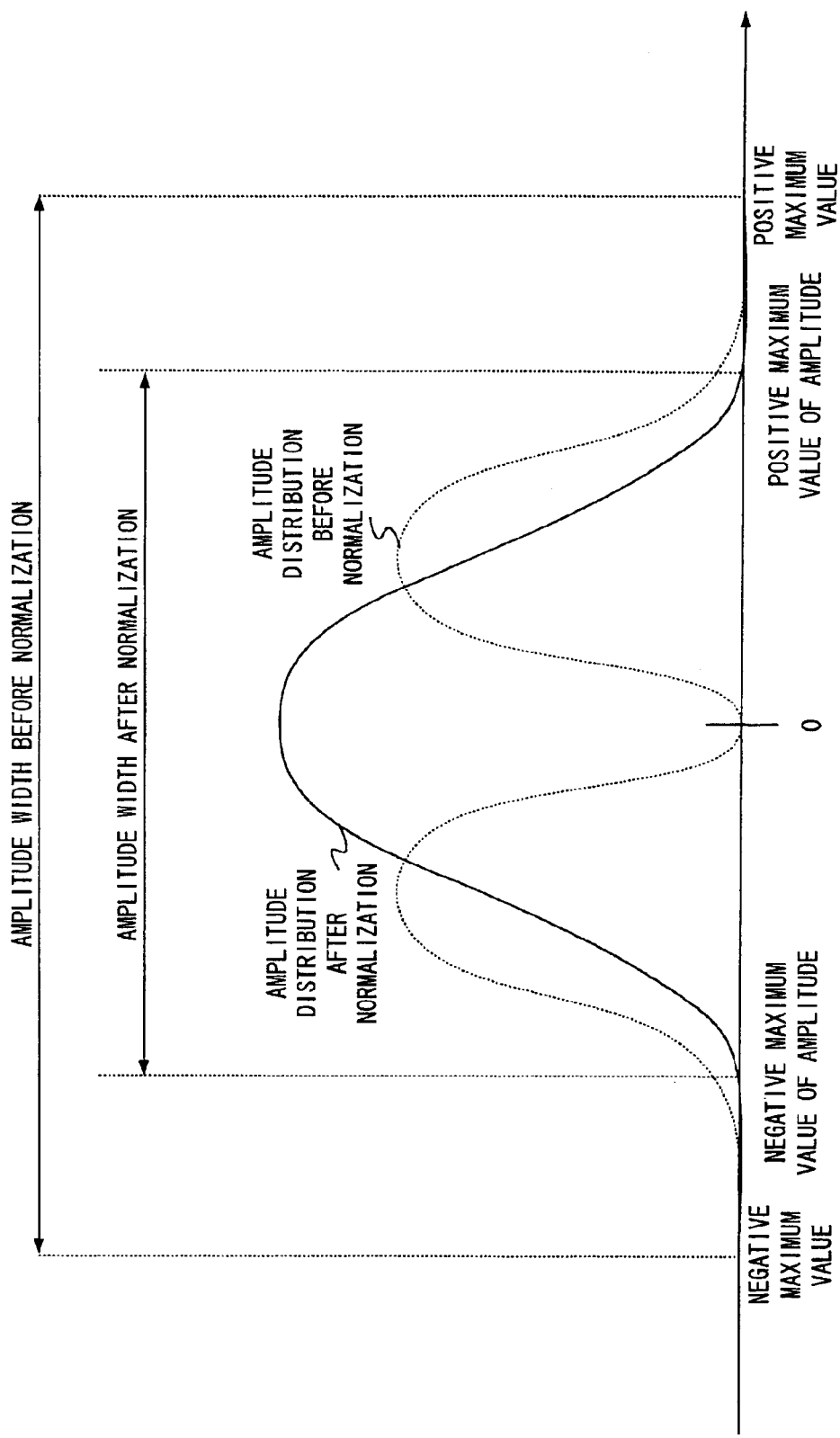
FIG. 5 illustrates an amplitude distribution after normalization by a conventional decoding apparatus.

If normalization is performed based on the maximum amplitude and bit length is restricted here, most of the slot data at timings other than t1 in the case of FIG. 3 results in underflow (becomes 0 as a soft decision value). Thus, normalizing this will cause the amount of distribution at an amplitude value of "0" to reach a maximum as shown in the amplitude distribution in FIG. 5, resulting in deterioration of error correcting efficiency.

Such a state occurs in a fading environment and occurs more frequently as the moving speed increases and a Doppler frequency increases. Thus, a BER (Bit Error Rate) characteristic in a fading environment deteriorates significantly, the communication quality deteriorates and a communication is cut off suddenly in the worst case.

Thus, this embodiment will describe a decoding apparatus and decoding method of calculating a reference number of shifts by averaging the number of shifts, adaptively fitting the amplitude width of a data string to be normalized within an effective bit width and thereby preventing underflow even if normalization processing is applied in a high-speed fading environment and demonstrating high error correcting efficiency. This embodiment focuses attention on the fact even if overflow occurs in areas where amplitude values are extremely larger than others, the error correcting efficiency is not affected significantly.

Figure 6:
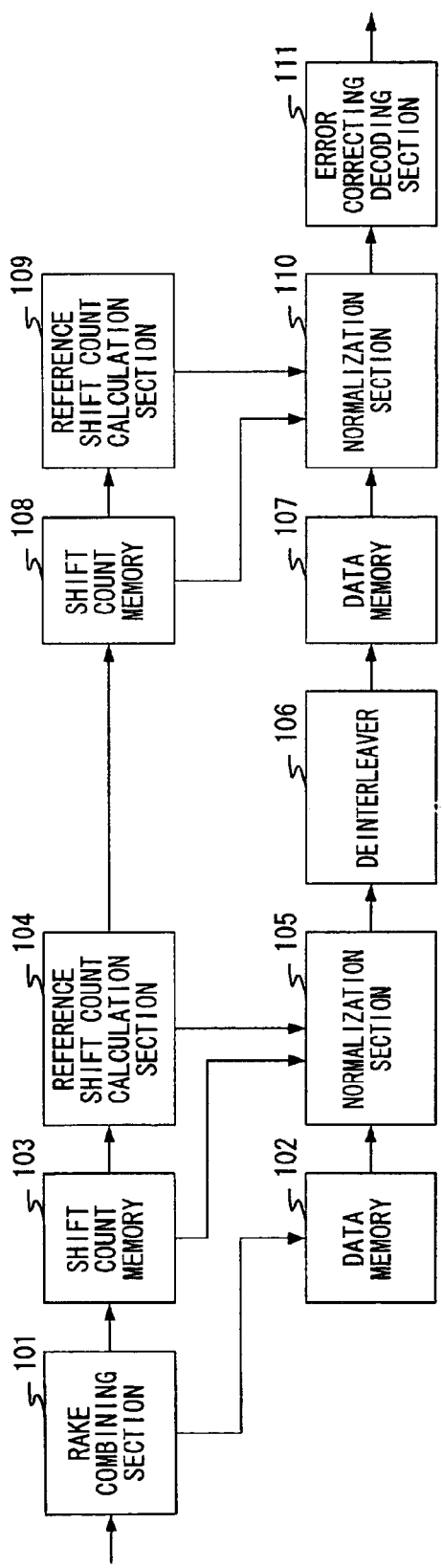
FIG. 6 is a block diagram showing a configuration of a decoding apparatus according to Embodiment 1 of the present invention.

FIG. 6 is a block diagram showing a configuration of a decoding apparatus according to Embodiment 1 of the present invention.

RAKE combining section 101 is fed received data subjected to despreading, carries out RAKE combining, restricts the RAKE-combined data to a predetermined bit width, writes the data into data memory 102 and writes the number of shifts when restricting the bit length into shift count memory 103.

Data memory 102 stores the RAKE-combined data slot by slot. Shift count memory 103 stores the number of shifts in each slot corresponding to the RAKE-combined data.

Reference shift count calculation section 104 averages the number of shifts stored in shift count memory 103 to calculate a first reference shift count. An operation of reference shift count calculation section 104 will be explained in more detail later.

Normalization section 105 normalizes the RAKE-combined data stored in data memory 102 within a frame based on the number of shifts stored in shift count memory 103 and the first reference shift count. An operation of normalization section 105 will be explained in more detail later.

Deinterleaver 106 carries out in-frame deinterleaving, etc. on the data normalized by normalization section 105, divides the data into transport channels and writes the data into data memory 107.

Data memory 107 stores the data divided into transport channels frame by frame. Shift count memory 108 stores the first reference shift count as the shift count of the relevant frame.

Reference shift count calculation section 109 averages the shift count stored in shift count memory 108 to calculate a second reference shift count. Normalization section 110 normalizes the data for every transport channel stored in data memory 107 within a TTI based on the number of shifts stored in shift count memory 108 and the second reference shift count.

Error correcting decoding section 111 carries out inter-frame deinterleaving, rate matching and error correcting decoding, etc. on the data normalized by normalization section 110.

Then, an operation of reference shift count calculation section 104 will be explained in more detail.

Assuming that the number of slot shifts is s(m){m=0 to number of physical channels×number of slots −1}, reference shift count calculation section 104 averages the shift count in the following steps (1) to (6) to calculate first reference shift count S1.

(1) S1=0
(2) m=0
(3) S1=S1+s(m)
(4) m=m+1
(5) Steps (3) and (4) are repeated until m=number of physical channels×number of slots.
(6) S1=S1/(number of physical channels×number of slots): (all digits to the right of the decimal point are rounded up)

Reference shift count calculation section 109 also averages the shift count and calculates a second reference shift count S2 through the same operation as that of above-described reference shift count calculation section 104. In this case, (number of physical channels×number of slots) is read as TTI/10 of a transport channel.

In (6) above, all digits to the right of the decimal point are rounded up, but it is also possible to discard all digits to the right of the decimal point.

Then, an operation of normalization section 105 will be explained in detail.

Figure 7:
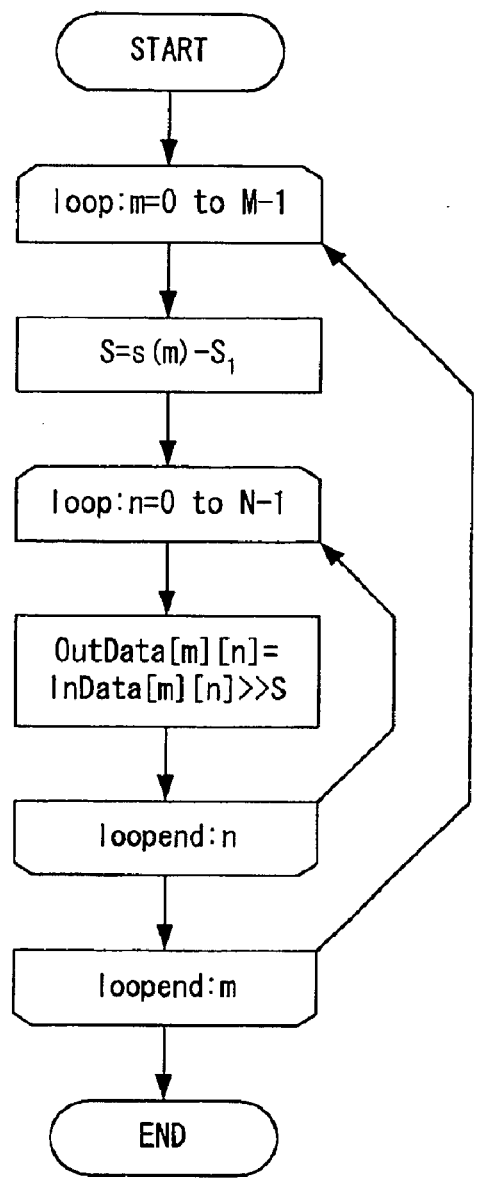
FIG. 7 is a flow chart of normalization processing of the decoding apparatus according to Embodiment 1 of the present invention.

Normalization section 105 generates output data string Out Data[m][n] through the flow shown in FIG. 7 using input data string In Data[m][n], shift count s[m] of each slot stored in shift count memory 103 and first reference shift count S1. By the way, N denotes a data count in one slot and M denotes (number of physical channels×number of slots) in FIG. 7.

BY operating according to the flow in FIG. 7, normalization section 105 carries out a right shift on input data string In Data[m][n] by a value obtained by subtracting first reference shift count S1 from shift count s[m] of each slot, and can thereby generate output data string Out Data[m][n].

By the way, normalization section 110 also generates output data string Out Data[m][n] through the same operation as that of above-described normalization section 105. In this case, (number of physical channels×number of slots) is read as TTI/10 of a transport channel.

Figure 8:
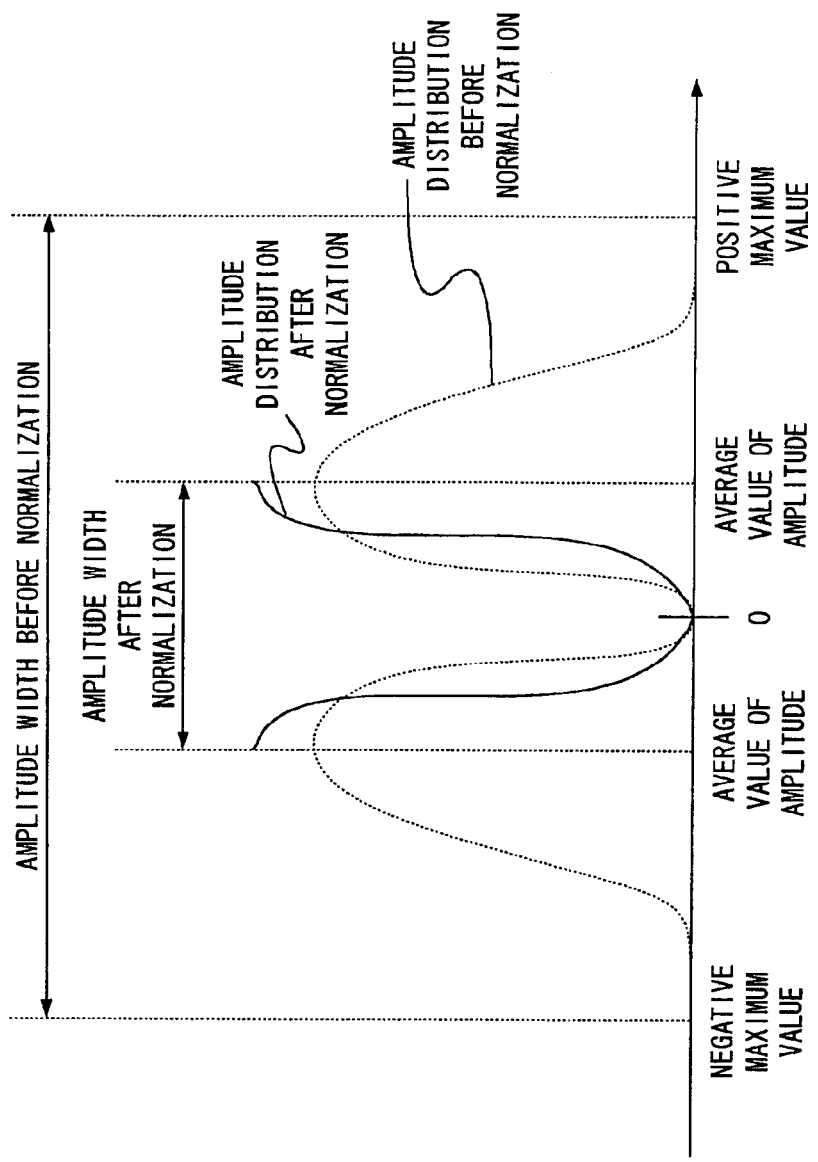
FIG. 8 illustrates an amplitude distribution after normalization by the decoding apparatus according to Embodiment 1 of the present invention.

FIG. 8 illustrates an amplitude distribution when a reference shift count is calculated by averaging a shift count, which shows a normal distribution where the amount of distribution reaches a maximum at an average value of amplitude values and the amount of distribution becomes almost 0 at an amplitude value of "0".

Thus, by averaging the shift count to calculate a reference shift count, it is possible to adaptively fit the amplitude width of a data string to be normalized within an effective bit width, thus preventing extreme underflow from occurring in a high-speed fading environment, effectively maintaining likelihood of the data string and enhancing error correcting efficiency. By the way, averaging a shift count to calculate a reference shift count causes overflow in areas where amplitude values are extremely larger than others, but does not cause any considerable effect on the error correcting efficiency.

(Embodiment 2)

Embodiment 2 will give a detailed explanation of an operation of normalization section 105 that is different from Embodiment 1.

Figure 9:
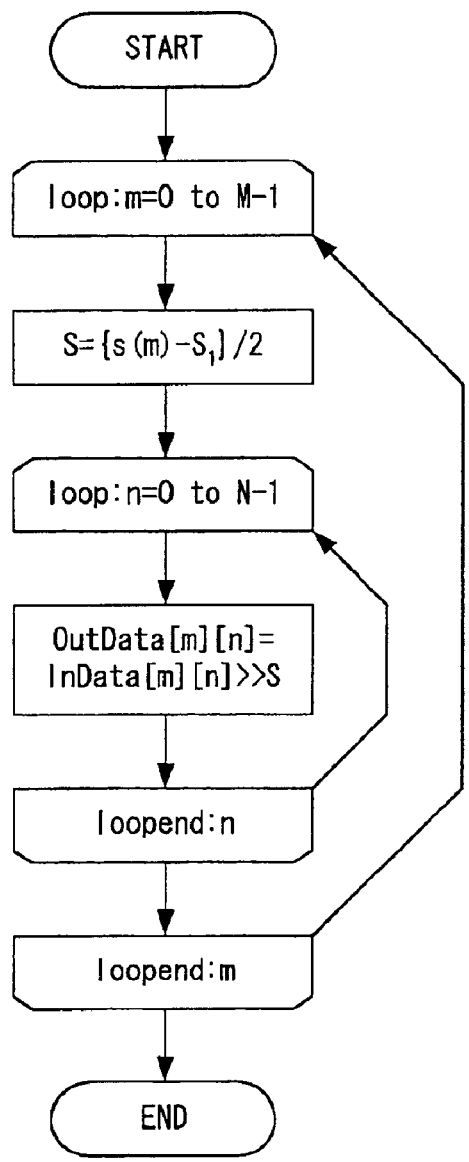
FIG. 9 is a flow chart of normalization processing of a decoding apparatus according to Embodiment 2 of the present invention.

Normalization section 105 generates output data string Out Data[m][n] through the flow shown in FIG. 9 using input data string In Data[m][n], shift count s[m] of each slot stored in shift count memory 103 and first reference shift count S1. By the way, N denotes a data count in one slot and M denotes (number of physical channels×number of slots) in FIG. 9.

BY operating according to the flow in FIG. 9, normalization section 105 carries out a right shift on input data string In Data[m][n] by ½ of a value obtained by subtracting first reference shift count S1 from shift count s[m] of each slot, and can thereby generate output data string Out Data[m][n].

This makes it possible to increase the probability of avoiding overflow compared to Embodiment 1.

By the way, normalization section 110 also generates output data string Out Data[m][n] through the same operation as that of above-described normalization section 105. In this case, (number of physical channels×number of slots) is read as TTI/10 of a transport channel.

(Embodiment 3)

Embodiment 3 will give a detailed explanation of an operation of normalization section 105 that is different from Embodiments 1 and 2.

Figure 10:
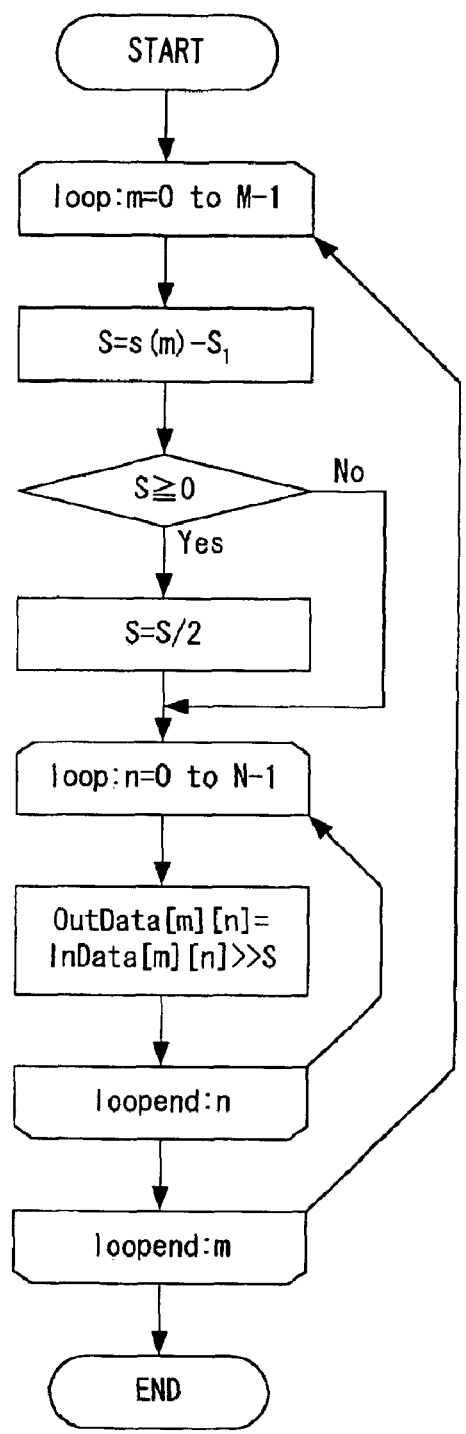
FIG. 10 is a flow chart of normalization processing of a decoding apparatus according to Embodiment 3 of the present invention.

Normalization section 105 generates output data string Out Data[m][n] through the flow shown in FIG. 10 using input data string In Data[m][n], shift count s[m] of each slot stored in shift count memory 103 and first reference shift count S1. By the way, N denotes a data count in one slot and M denotes (number of physical channels×number of slots) in FIG. 10.

BY operating according to the flow in FIG. 10, normalization section 105 carries out a right shift on input data string In Data[m][n] by S/2 when value S obtained by subtracting first reference shift count S1 from shift count s[m] of each slot is 0 or greater, and can thereby generate output data string Out Data[m][n]. Furthermore, normalization section 105 carries out a right shift on input data string In Data[m][n] by S when value S obtained by subtracting first reference shift count S1 from shift count s[m] of each slot is negative, and can thereby generate output data string Out Data[m][n].

This makes it possible to drastically increase the probability of avoiding underflow compared to Embodiment 1.

By the way, normalization section 110 also generates output data string Out Data[m][n] through the same operation as that of above-described normalization section 105. In this case, (number of physical channels×number of slots) is read as TTI/10 of a transport channel.

(Embodiment 4)

Embodiment 4 will give a detailed explanation of an operation of normalization section 105 that is different from Embodiments 1 to 3.

Figure 11:
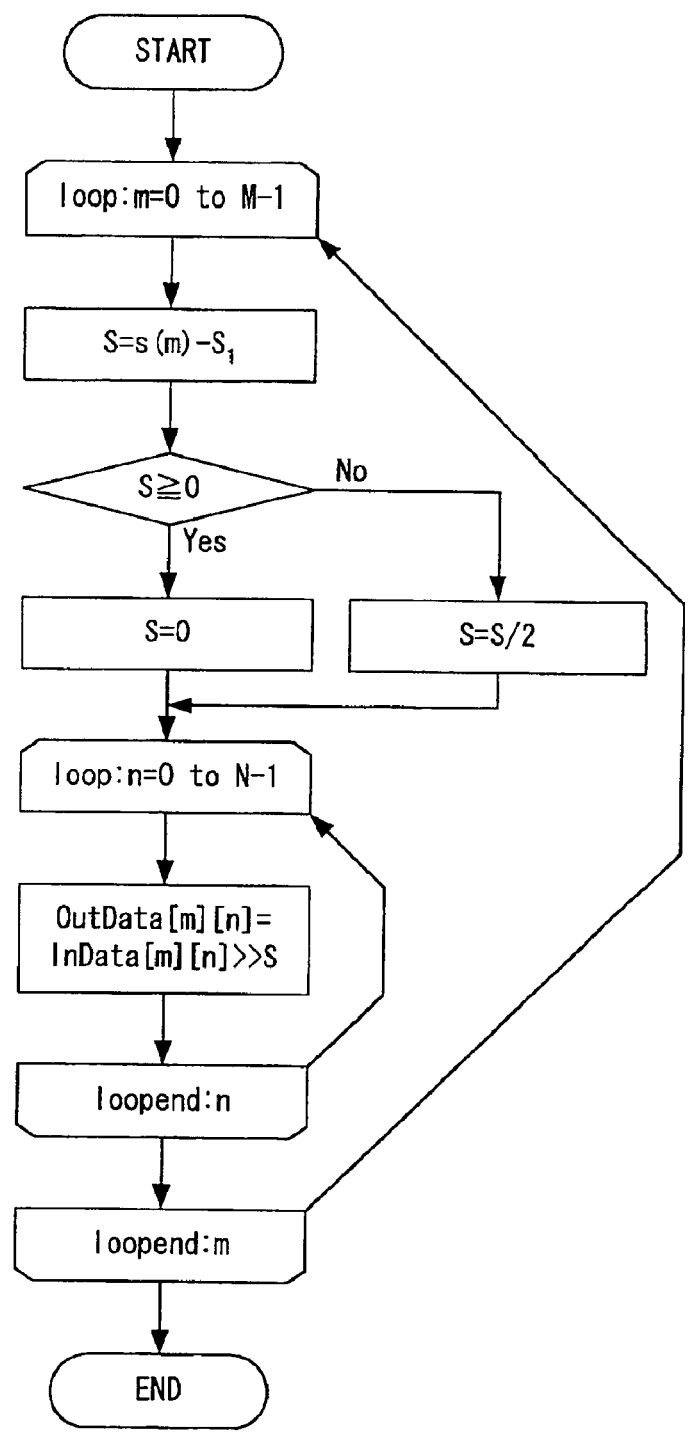
FIG. 11 is a flow chart of normalization processing of a decoding apparatus according to Embodiment 4 of the present invention.

Normalization section 105 generates output data string Out Data[m][n] through the flow shown in FIG. 11 using input data string In Data[m][n], shift count s[m] of each slot stored in shift count memory 103 and first reference shift count S1. By the way, N denotes a data count in one slot and M denotes (number of physical channels×number of slots) in FIG. 11.

BY operating according to the flow in FIG. 11, normalization section 105 sets the shift count of input data string In Data[m][n] to 0 when value S obtained by subtracting first reference shift count S1 from shift count s[m] of each slot is 0 or greater, and can thereby generate output data string Out Data[m][n]. Furthermore, normalization section 105 carries out a right shift on input data string In Data[m][n] by S/2 when value S obtained by subtracting first reference shift count S1 from shift count s[m] of each slot is negative, and can thereby generate output data string Out Data[m][n].

This makes it possible to drastically increase the probability of avoiding underflow and overflow compared to Embodiment 1.

By the way, normalization section 100 also generates output data string Out Data[m][n] through the same operation as that of above-described normalization section 105. In this case, (number of physical channels×number of slots) is read as TTI/10 of a transport channel.

(Embodiment 5)

Embodiment 5 will give a detailed explanation of an operation of normalization section 105 that is different from Embodiments 1 to 4.

Figure 12:
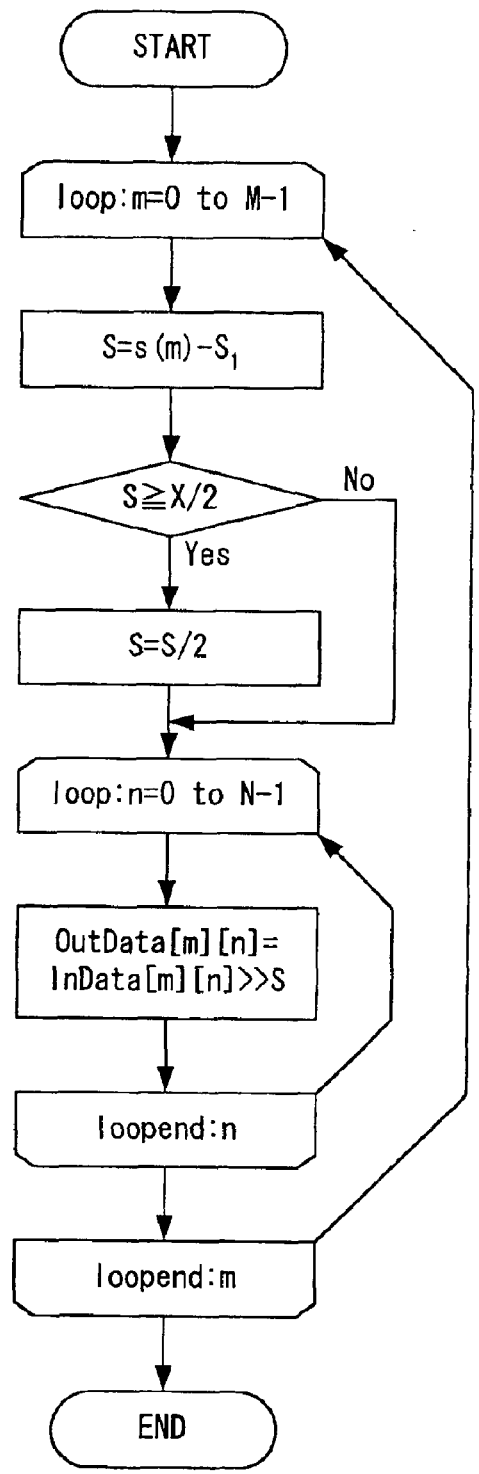
FIG. 12 is a flow chart of normalization processing of a decoding apparatus according to Embodiment 5 of the present invention.

Normalization section 105 generates output data string Out Data[m][n] through the flow shown in FIG. 12 using input data string In Data[m][n], shift count s[m] of each slot stored in shift count memory 103 and first reference shift count S1. By the way, N denotes a data count in one slot and M denotes (number of physical channels×number of slots) in FIG. 12.

BY operating according to the flow in FIG. 12, normalization section 105 carries out a right shift on input data string In Data[m][n] by S/2 when value S obtained by subtracting first reference shift count S1 from shift count s[m] of each slot is ½ of effective bit width X or greater, and can thereby generate output data string Out Data[m][n].

This produces the effect of avoiding underflow in addition to the effect in Embodiment 1.

By the way, normalization section 110 also generates output data string Out Data[m][n] through the same operation as that of above-described normalization section 105. In this case, (number of physical channels×number of slots) is read as TTI/10 of a transport channel.

(Embodiment 6)

Embodiment 6 will give a detailed explanation of an operation of normalization section 105 that is different from Embodiments 1 to 5.

Figure 13:
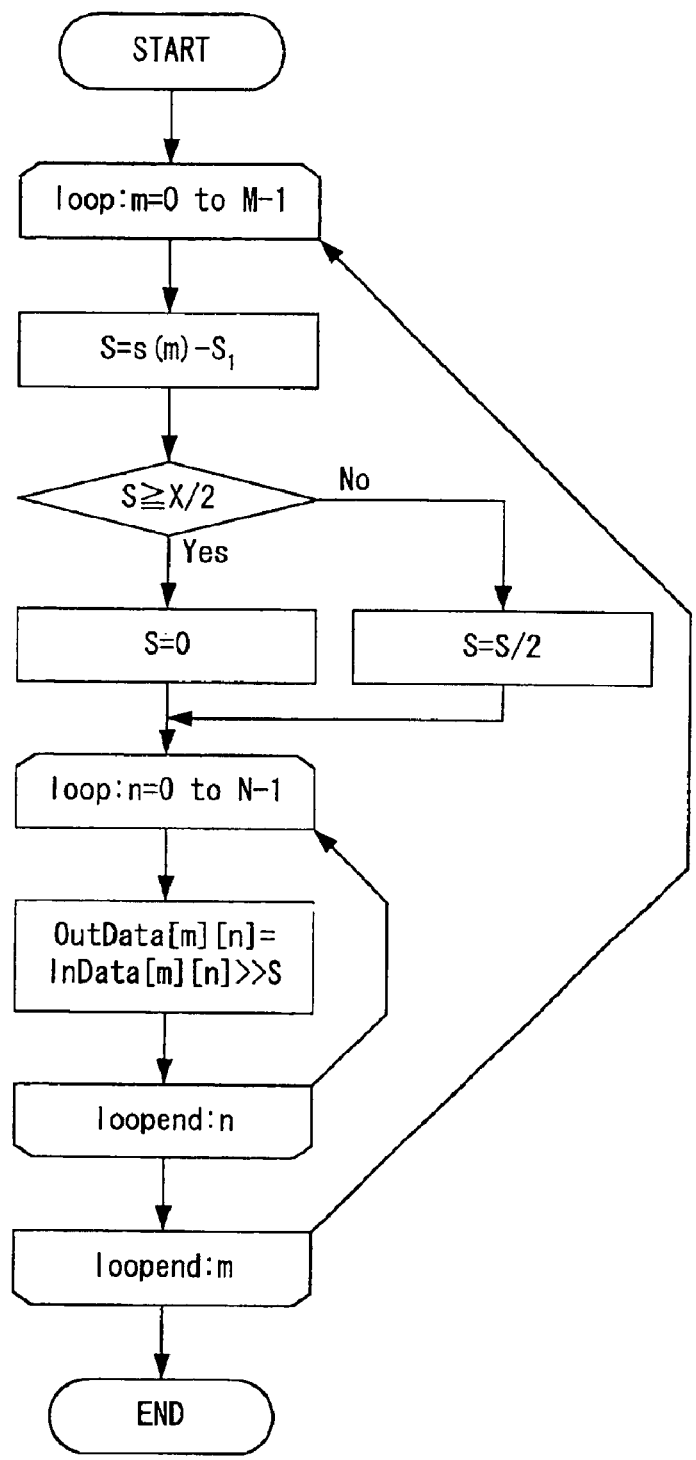
FIG. 13 is a flow chart of normalization processing of a decoding apparatus according to Embodiment 6 of the present invention.

Normalization section 105 generates output data string Out Data[m][n] through the flow shown in FIG. 13 using input data string In Data[m][n], shift count s[m] of each slot stored in shift count memory 103, first reference shift count S1 and effective bit width X. By the way, N denotes a data count in one slot and M denotes (number of physical channels×number of slots) in FIG. 13.

BY operating according to the flow in FIG. 13, normalization section 105 sets the shift count of input data string In Data[m][n] to 0 when value S obtained by subtracting first reference shift count S1 from shift count s[m] of each slot is ½ of effective bit width X or greater, and can thereby generate output data string Out Data[m][n]. Furthermore, normalization section 105 carries out a right shift on input data string In Data[m][n] by S/2 when value S obtained by subtracting first reference shift count S1 from shift count s[m] of each slot is smaller than ½ of effective bit width X, and can thereby generate output data string Out Data[m][n].

This produces the effect of avoiding underflow and overflow in addition to the effect in Embodiment 1.

By the way, normalization section 110 also generates output data string Out Data[m][n] through the same operation as that of above-described normalization section 105. In this case, (number of physical channels×number of slots) is read as TTI/10 of a transport channel.

(Embodiment 7)

Here, there is a proposal for a third-generation mobile communication system using a CDMA system to perform variable rate transmissions making a data rate variable in TTI units. In this case, there is a proposal that a decoding apparatus on the receiver side should decide a data rate without using data rate identification information such as TFCI (Transport Format Combination Indicator), etc., or make a so-called blind data rate decision (Blind Transport Format Detection; hereinafter referred to as "BTFD").

By the way, the transmitter side sends error correcting coded data divided into frames corresponding to 1 TTI. Thus, TTI becomes the unit for carrying out error correcting decoding on data.

In a variable rate transmission on voice data proposed in a third-generation mobile communication system using a CDMA system, a difference between transmission rates is very small (difference on the order of several bits to several tens of bits per one block). For this reason, when a data rate is decided according to the number of errors of hard decision symbols, errors in only a few bits that have occurred in the propagation path may cause the number of normalized symbol errors to become equal among a plurality of transmission rates, making it impossible to decide the data rate.

Furthermore, in a mobile communication system, variations in the amplitude of a radio signal are expected to increase due to influences of fading. Since symbols with a reduced amplitude (lowered likelihood) under the great influence of fading is more likely to have errors in hard decision results, if a data rate is decided according to the number of hard decision symbol errors, the error decision rate of the data rate may increase. When the data rate is wrongly decided, data is decoded at a wrong data rate, and therefore all data of TTI whose data rate has been wrongly decided may be decoded erroneously, deteriorating the error rate characteristic of received data significantly.

Furthermore, when the data rate is decided according to the number of hard decision symbol errors, all Viterbi-decoded data is recoded independently of the coding system, and therefore there is a problem that the amount of processing and power consumption required for data rate decision will increase.

Thus, Embodiment 7 will describe a decoding apparatus and decoding method that calculate likelihood of each data rate using demodulated data and decoded data obtained by decoding the demodulated data at a plurality of types of candidate data rates, decide the data rate with the highest likelihood as the correct data rate of the demodulated data, and can thereby decide a data rate with the likelihood of the demodulated data taken into consideration, improve the accuracy of data rate decision and thereby reduce the amount of processing and power consumption required for data rate decision. This embodiment takes note of the fact that demodulated data after demodulation and before decoding is a soft decision value and it is possible to calculate likelihood of each data rate to be a candidate using this soft decision value.

Figure 14:
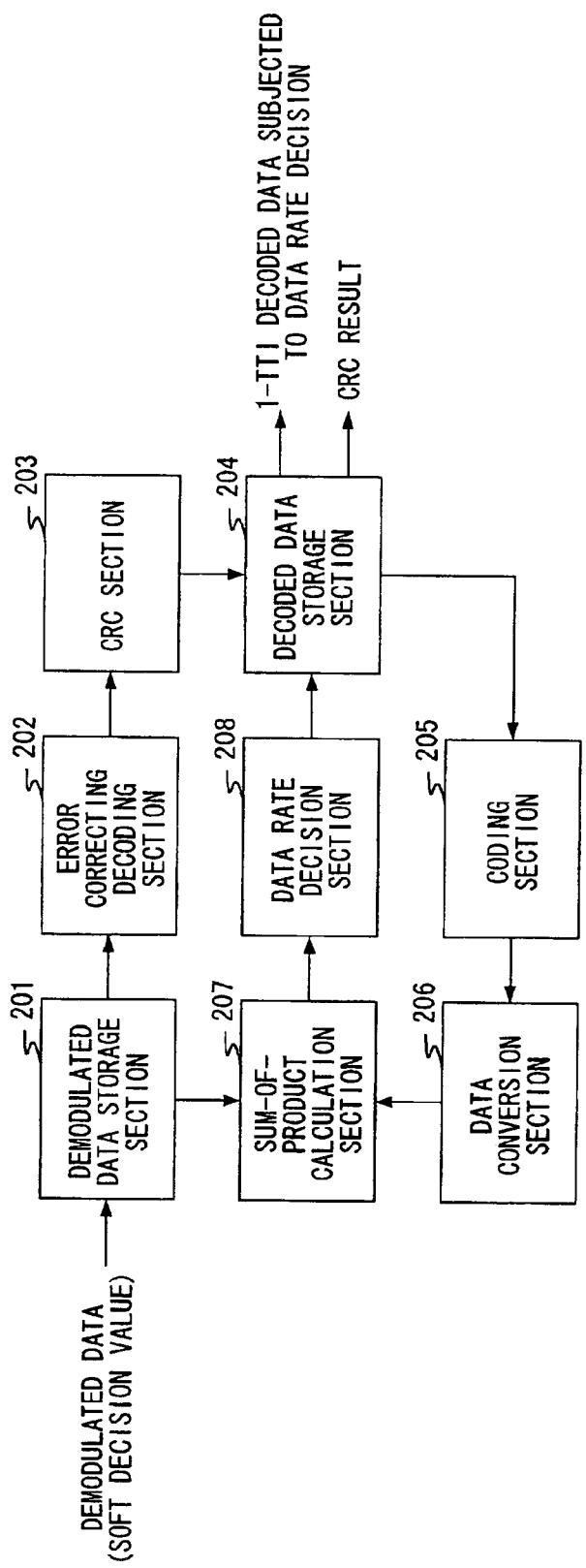
FIG. 14 is a block diagram showing a configuration of a decoding apparatus according to Embodiment 7 of the present invention.

FIG. 14 is a block diagram showing a configuration of a decoding apparatus according to Embodiment 7 of the present invention. The decoding apparatus shown in FIG. 14 is mounted on, for example, a communication terminal apparatus such as cellular phone used in a mobile communication system. This communication terminal apparatus performs radio communications according to a CDMA system, for example.

In this embodiment, suppose data sent from the other end of communication is data "0" or "1" subjected to error correcting coding at a predetermined code rate and predetermined constraint length (assumed to be convolutional coding here), subjected to interleaving, etc. and then spread and modulated, converted to "1" or "−1" respectively and sent. Furthermore, suppose the data rate of data to be sent is selected in such a way that one data rate from among M types of data rates is selected in TTI units before error correcting coding of data.

In the decoding apparatus shown in FIG. 14, demodulated data storage section 201 stores demodulated data in TTI units. The demodulated data here is data after a series of demodulation processing such as despreading, RAKE combining, deinterleaving and before error correcting decoding, and therefore the demodulated data becomes data of a soft decision value in a range of −X to X (X: maximum value that the data can take on after completing processing immediately before error correcting decoding). Furthermore, the value of X is determined by the apparatus configuration before demodulated data storage section 201.

Error correcting decoding section 202 performs error correcting decoding on the demodulated data stored in demodulated data storage section 201 at each of M types of candidate data rates based on a Viterbi algorithm, for example. Then, when decoding corresponding to 1 TTI is completed, error correcting decoding section 202 outputs 1-TTI decoded data together with information indicating the data rate during decoding (hereinafter referred to as "data rate information") to CRC section 203.

CRC section 203 performs error detection on each piece of the decoded data with M types of data rates in TTI units using error detection codes such as CRC codes added to the decoded data for each transport block. Then, CRC section 203 outputs only the 1-TTI decoded data where no error has been detected together with the data rate information and CRC result (that is, "0" indicating that no error has been detected) to decoded data storage section 204.

Here, when a plurality of transport blocks is included in 1 TTI (that is, decoding unit), CRC section 203 carries out error detection on the 1-TTI decoded data according to the error detection result of predetermined one or a plurality of transport blocks out of a plurality of transport blocks included in 1 TTI.

That is, 1) CRC section 203 decides that all 1-TTI decoded data contains errors when error detection is carried out only on the last transport block of a plurality of transport blocks included in 1 TTI and an error is detected in the last transport block. 2) CRC section 203 decides that all 1-TTI decoded data contains errors when errors are detected in more than half of a plurality of transport blocks included in 1 TTI. 3) CRC section 203 decides that all 1-TTI decoded data contains errors when errors are detected in more than half of a plurality of transport blocks included in 1 TTI and an error is detected in the last transport block.

When error correcting decoding section 202 carries out error correcting decoding based on a Viterbi algorithm, it is preferable to use the method in 1) above. This is because the Viterbi algorithm is characterized in that data in the end section of 1-TTI data string has higher decoding accuracy than data in the leading section, that is, the error detection result of decoded data in the end section has higher reliability. In this case, it is possible to increase the error decision reliability by making an error decision on the 1-TTI decoded data using the error detection result on the last transport block and thereby improve the reliability of error decision. Furthermore, it is only necessary to perform error detection on the last transport block in this case, and therefore it is possible to reduce the number of times error detection is performed.

Furthermore, according to error detection (CRC) specified by a third-generation mobile communication standard (3GPP), even an error in 1 bit of data contained in a transport block may cause an error to be detected in the transport block or on the contrary, even if most bits contain errors, no error may be detected in the transport block. Therefore, making an error decision on the 1-TTI decoded data according to the error detection result of a plurality of transport blocks as in the method in 2) above makes it possible to improve the reliability of error decision. Or combining 1) and 2) above as in the case of the method in 3) above can further improve the reliability of error decision when error correcting decoding section 202 carries out error correcting decoding based on the Viterbi algorithm.

Decoded data storage section 204 stores the decoded data in which no error is detected by CRC section 203 together with the data rate information of the decoded data and CRC result in TTI units for every data rate. Furthermore, decoded data storage section 204 outputs the 1-TTI decoded data corresponding to the data rate decided by data rate decision section 208, which will be described later, together with the CRC result.

Coding section 205 recodes decoded data stored in decoded data storage section 204 at the same code rate and with the same constraint length used for convolutional coding carried out on the other end of communication. In this case, coding section 205 recodes each decoded data piece at the data rate indicated by the data rate information. Recoded data "0" or "1" is output to data conversion section 206 together with the data rate information in TTI units.

Data conversion section 206 converts data "0" to "1" and data "1" to "−1" output from coding section 205 according to the data modulation (data "0" is converted to "1" and data "1" converted to "−1") carried out on the other end of communication. Sum-of-product calculation section 207 multiplies the data output from data conversion section 206 by the demodulated data (soft decision value) stored in demodulated data storage section 201, and then sums up the products for 1 TTI and stores the sum-of-product result for each data rate.

Data rate decision section 208 detects the maximum value of the sum-of-product result from among the sum-of-product results obtained at sum-of-product calculation section 207 and decides the data rate corresponding to the maximum value of the sum-of-product result as the data rate of the demodulated data. Then, data rate decision section 208 outputs the data rate control signal indicating the decided data rate to decoded data storage section 204.

Then, an operation of the decoding apparatus in the above-described configuration will be explained.

Error correcting decoding section 202 carries out error correcting decoding on the data stored in decoded data storage section 201 at all M types of candidate data rates. The decoded data subjected to error correcting decoding at M types of data rates is output to CRC section 203 together with the data rate information in TTI units for error detection. Of the decoded data with M types of data rates, only decoded data at N (N≦M) types of data rates free of errors is stored in decoded data storage section 204 together with data rate information and CRC result and decoded data containing errors is discarded.

Here, this embodiment assumes the results of decoding the demodulated data at their respective data rates (in which no error is detected by error detection) as correct decoded data. Then, assuming that the most likely data out of the decoded data, which has been assumed to be correct decoded data, as the data decoded at a correct data rate, this embodiment decides the data rate.

Furthermore, as described above, the demodulated data is a soft decision value in the range of −X to X. At this time, the probability that the demodulated data will be decoded correctly increases as the soft decision value comes closer to −X or X and decreases as the soft decision value comes closer to 0. That is, the probability that the demodulated data will be decoded correctly increases as the absolute value of a soft decision value increases. Thus, this embodiment calculates likelihood (degree of certainty) of a data rate using this soft decision value and decides the data rate of the demodulated data based on the level of the likelihood.

That is, coding section 205 recodes the decoded data with M types of data rates stored in decoded data storage section 204 at a data rate indicated by data rate information of each decoded data piece. Recoding is performed in descending order of data rates, for example. Recoded data "0" or "1" is output to data conversion section 206 together with data rate information in TTI units.

Data conversion section 206 converts data "0" to "1" and data "1" to "−1". The converted data is output to sum-of-product calculation section 207 together with the data rate information in TTI units.

Sum-of-product calculation section 207 multiplies the data (hereinafter referred to as "converted data") output from data conversion section 206 by the demodulated data (soft decision value) stored in demodulated data storage section 201 among the corresponding symbols, and then sums up the products for symbols corresponding in number to the respective data rates.

Since the number of symbols included in 1 TTI at each data rate is predetermined, sum-of-product calculation section 207 divides the sum-of-product result of summing up products for symbols corresponding in number to the respective data rates by the number of symbols and thereby normalizes the sum-of-product result at the respective data rates. The normalized sum-of-product results are stored in a memory of sum-of-product calculation section 207 according to the respective data rates.

Here, when the sign (positive or negative) of the converted data matches the sign (positive or negative) of the demodulated data, the product of these data becomes a positive value and when these signs do not match, the product of those data becomes a negative value. Furthermore, the absolute value of the product is proportional to the absolute value of the soft decision value. Therefore, the greater the number of symbols in which the sign of the soft decision value matches the sign of the converted data, the greater the normalized sum-of-product becomes, and the greater the absolute value of a soft decision value when the signs match, the greater the normalized sum-of-product becomes. That is, the normalized sum-of-product is equivalent to relative energy of likelihood between decoded data pieces which have been decoded at their respective data rates.

The greater the value of the normalized sum-of-product, the higher the likelihood of the data rate is considered. Therefore, data rate decision section 208 detects the maximum value of the sum-of-product result from among the sum-of-product results stored in the memory of sum-of-product calculation section 207 and decides the data rate corresponding to the maximum value as the data rate of the demodulated data. Then, a data rate control signal indicating the decided data rate is output to decoded data storage section 204.

Then, decoded data storage section 204 outputs the 1-TTI decoded data corresponding to the data rate decided by decision section 208 together with the CRC result.

Thus, this embodiment calculates likelihood of each data rate using a soft decision value and decoded data, decides the data rate with the highest likelihood as a correct data rate, and can thereby decide the data rate with the likelihood of demodulated data taken into consideration and drastically reduce the probability that the data rate will be erroneously decided.

Furthermore, decoded data in which errors are detected by error detection such as CRC is discarded and is not subjected to data rate decision processing such as recoding and sum-of-product calculation. This makes it possible to narrow down the range of candidate data rates before carrying out data rate decision processing and thereby reduce an average amount of processing and average power consumption required for data rate decision.

This embodiment has described the case where data sent from the other end of communication is convolutional-coded data. However, even when the data sent from the other end of communication is coded according to any coding system other than convolutional coding, if error correcting decoding section 202 performs decoding according to a decoding system corresponding to the coding system on the other end of communication and coding section 205 performs recoding according to the coding system on the other end of communication, it is possible to make a data rate decision in the same way as described above. For example, when the data sent from the other end of communication is turbo-coded, if error correcting decoding section 202 performs turbo decoding and coding section 205 performs recoding using turbo codes, it is possible to make a data rate decision in the same way as described above.

Furthermore, this embodiment has described normalization processing carried out by sum-of-product calculation section 207 as processing of dividing the sum-of-product result resulting from summing up products for symbols corresponding in number to the respective data rates by the number of symbols. However, it is also possible to carry out normalization processing by calculating a least common denominator among symbols corresponding in number to the respective data rates, dividing the least common denominator by the number of symbols corresponding to the respective data rates and multiplying the sum-of-product result resulting from summing up products for symbols corresponding in number to the respective data rates by the division results. Furthermore, it is also possible to carry out normalization processing by calculating a greatest common divisor among symbols corresponding in number to the respective data rates, dividing the number of symbols corresponding to the respective data rates by the greatest common divisor and dividing the sum-of-product result resulting from summing up products for symbols corresponding in number to the respective data rates.

Furthermore, this embodiment can also be constructed in such a way that sum-of-product calculation section 207 multiplies the sum-of-product result by a predetermined coefficient or multiplies the sum-of-product result by a constant by applying a shift operation to the sum-of-product result, etc. to carry out normalization. Thus, by multiplying the sum-of-product result by a constant, even if the sum-of-product result becomes a very small value, it is possible to prevent underflow from occurring in the sum-of-product result after normalization.

(Embodiment 8)

This embodiment will describe a case where demodulated data is organizing-coded (e.g., turbo-coded) data.

When demodulated data is an organizing-code such as turbo code, the demodulated data is composed of information bits and coding bits, which can be easily separated. That is, bits in the demodulated data can be distinguished between information bits to be decoded as decoded data and coding bits to be added to correct errors in the information bits.

Thus, this embodiment decides data rates according to the result of a sum of products of information bits extracted from demodulated data and decoded data which is not to be recoded. When demodulated data is an organizing code, this makes it possible to decide data rates without carrying out recoding processing on decoded data and thereby drastically shorten a processing time required for data rate decision.

Figure 15:
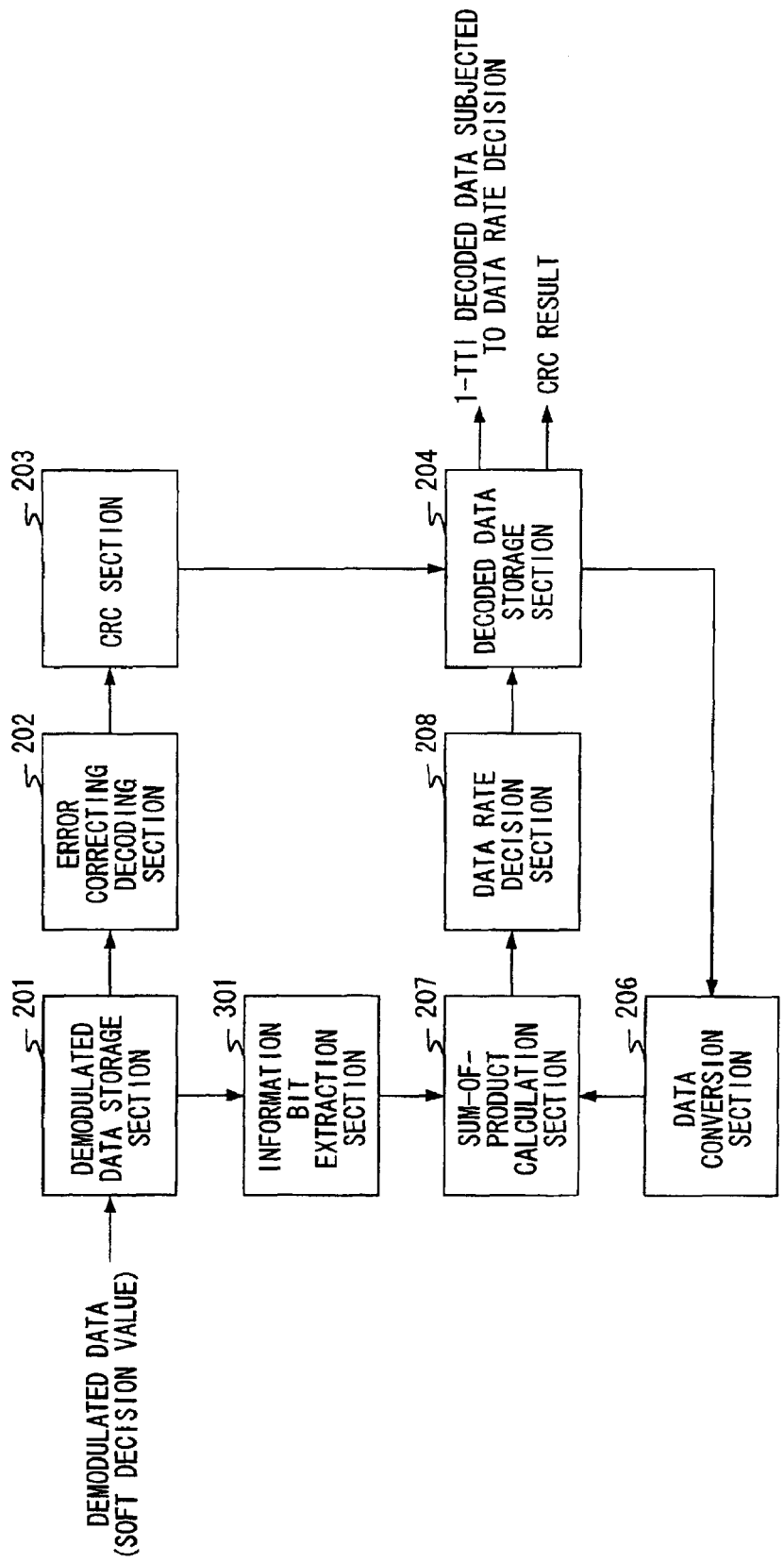
FIG. 15 is a block diagram showing a configuration of a decoding apparatus according to Embodiment 8 of the present invention.

FIG. 15 is a block diagram showing a configuration of a decoding apparatus according to Embodiment 8 of the present invention. As shown in this figure, when compared to the decoding apparatus shown in FIG. 14, the decoding apparatus according to this embodiment is constructed without coding section 205 for recoding decoded data but including information bit extraction section 301 that extracts information bits from demodulated data. The same components in FIG. 15 as those in FIG. 14 are assigned the same reference numerals and detailed explanations thereof will be omitted.

In FIG. 15, demodulated data input to demodulated data storage section 201 is an organizing code such as turbo code. Information bit extraction section 301 extracts only information bits from the demodulated data stored in demodulated data storage section 201 and outputs to sum-of-product calculation section 207. Data conversion section 204 converts data "0" stored in decoded data storage section 204 to "1" and data "1" to "−1" and outputs to sum-of-product calculation section 207.

Sum-of-product calculation section 207 obtains the result of a sum of products of data output from data conversion section 206 and information bits output from information bit extraction section 301 for each of N types of candidate data rates. The sum-of-product result is normalized as in the case of Embodiment 7.

Data rate decision section 208 detects the maximum value of the sum-of-product result from among the sum-of-product results and decides the data rate corresponding to the maximum value of the sum-of-product result as the data rate of the demodulated data. Then, a data rate control signal indicating the decided data rate is output to decoded data storage section 204.

Thus, when demodulated data is an organizing code, this embodiment decides the data rate according to the sum-of-product result of the information bits extracted from the demodulated data and decoded data which is not to be recoded, and can thereby eliminate the need for recoding processing which would involve a very large amount of calculation. Thus, compared to Embodiment 7, this embodiment can further reduce the amount of processing and power consumption required for data rate decision.

(Embodiment 9)

Since Embodiment 7 above decides data rates only targeted at decoded data in which no error is detected, if errors are detected in all M types of candidate data rates due to influences of deterioration of channel situations, etc., no decision is made on the data rate of the demodulated data.

If a voice communication exists (that is, when demodulated data is voice data), the voice data is reproduced according to the data rate decided by a decoding apparatus. For this reason, when no data rate is decided, it is no longer possible to reproduce the 1-TTI voice data, producing a silent segment.

On the other hand, when the demodulated data is voice data, even when errors are detected in all M types of candidate data rates, if the degree of those errors is relatively small, it is possible to reproduce the voice correctly to a certain degree using a voice decoding method such as AMR (Adaptive Multi Rate) if it is at least possible to decide the most likely data rate.

Thus, even when errors are detected in decoded data at all candidate data rates, this embodiment carries out data decision processing targeted at the decoded data in which errors are detected, and thereby decides the most likely data rate.

Figure 16:
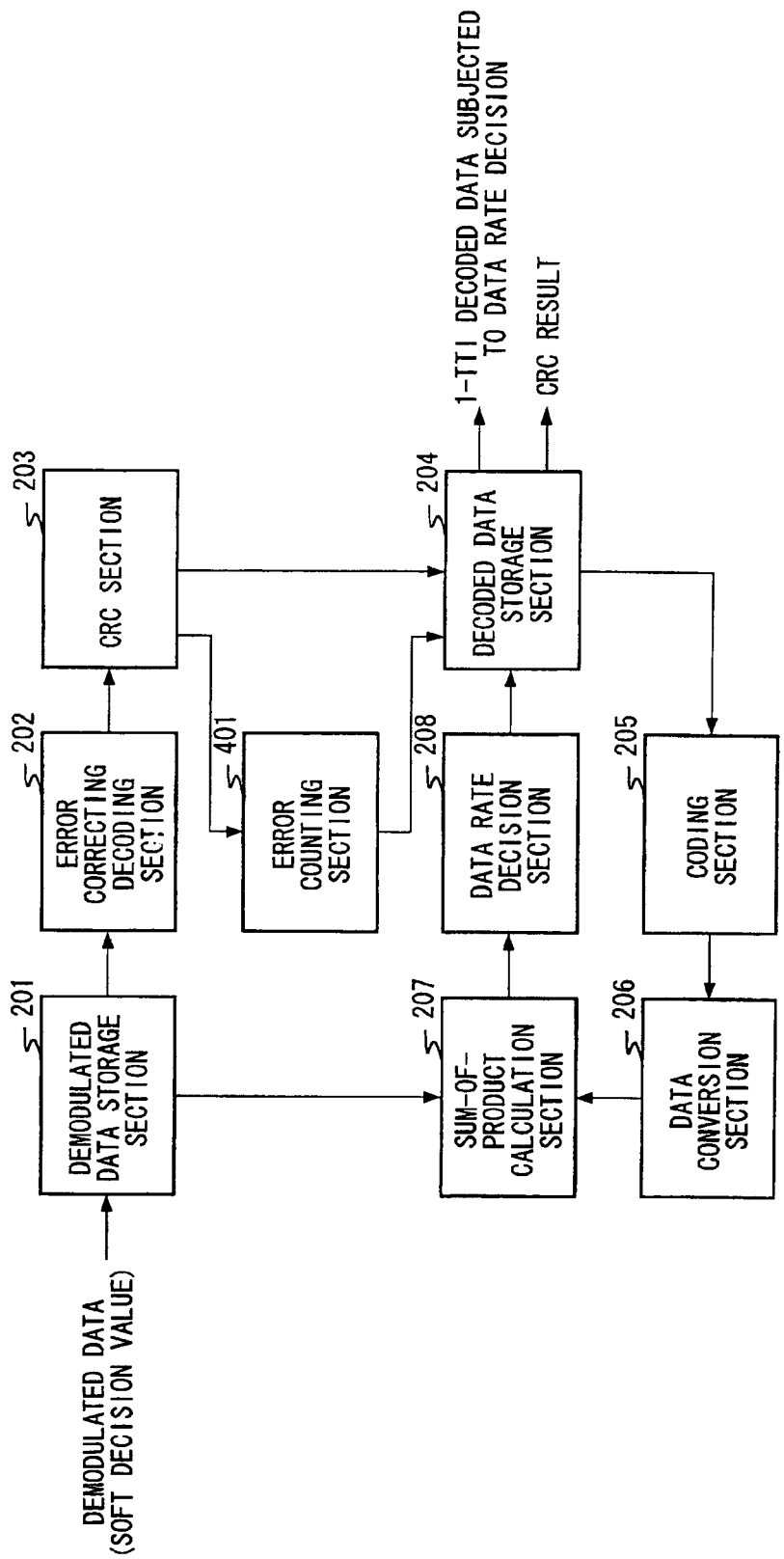
FIG. 16 is a block diagram showing a configuration of a decoding apparatus according to Embodiment 9 of the present invention.

FIG. 16 is a block diagram showing a configuration of a decoding apparatus according to Embodiment 9 of the present invention. As shown in this figure, when compared to the decoding apparatus shown in FIG. 14, the decoding apparatus according to this embodiment is constructed by additionally including error counting section 401 that counts the number of decoded data pieces in which errors are detected by CRC section 203 out of the decoded data with M types of candidate data rates. By the way, the same components in FIG. 16 as those in FIG. 14 are assigned the same reference numerals as those in FIG. 14 and detailed explanations thereof will be omitted.

In FIG. 16, CRC section 203 performs error detection on each piece of the decoded data with M types of data rates in TTI units using error detection codes such as CRC codes added to the decoded data. Then, CRC section 203 outputs 1-TTI decoded data together with the data rate information and CRC result (that is, "0" indicating that no error has been detected or "1" indicating that some error has been detected) to decoded data storage section 204 and error counting section 401.

Error counting section 401 counts the number of decoded data pieces in which errors are detected by CRC section 203. That is, error counting section 401 counts the number of times "1" is output from among the CRC results output from CRC section 203.

Then, when the number of times "1" is output reaches M, which is the number of candidate data rates, error counting section 401 instructs decoded data storage section 204 to output all decoded data of M types of candidate data rates to coding section 204. That is, when errors are detected in all M types of candidate data rates, subsequent data rate decision processing will be carried out targeted at all decoded data pieces with errors.

Thus, even when errors are detected in all M types of candidate data rates, the most likely data rate is decided out of M types of candidate data rates. In other words, it is possible to prevent data rates of demodulated data from not being decided.

On the other hand, when the number of times "1" is output is smaller than M, which is the number of candidate data rates, error counting section 401 instructs decoded data storage section 204 to discard decoded data in which errors are detected and output only decoded data in which no error is detected to coding section 204. That is, when at least one of decoded data with M types of candidate data rates contains no error, the subsequent data rate decision processing is carried out in the same way as Embodiment 7.

Thus, even when errors are detected in decoded data with all candidate data rates, this embodiment decides the most likely data rate using the decoded data in which errors are detected, and therefore this embodiment can prevent a data irreproducible period from occurring in a communication in which there is a certain degree of tolerance for errors in decoded data (e.g., voice communication).

By the way, error counting section 401 in this embodiment may also count the number of times "0" is output from among the CRC results output from CRC section 203. In this case, when the number of times "0" is output is 0, error counting section 401 instructs decoded data storage section 204 to output all decoded data of M types of candidate data rates to coding section 204, and when the number of times "0" is output is 1 or more, error counting section 401 instructs decoded data storage section 204 to discard decoded data with errors and output only decoded data without errors to coding section 204.

(Embodiment 10)

In a CRC carried out at CRC section 203, there are cases where even 1 bit of decoded data has an error, an error is detected in the decoded data or on the contrary, when most bits of the decoded data have errors, no error is detected in the decoded data. That is, decoded data in which no error is detected has a higher error rate than decoded data in which some errors are detected.

In such a case, when data rate decision is performed only targeted at decoded data in which no error is detected as in the case of Embodiment 7, the data rate of the decoded data with a higher error rate may be decided as the data rate of demodulated data. As a result, decoded data storage section 204 may output decoded data with a wrong data rate with a high error rate.

Furthermore, when decoded data in which no error is detected has a higher error rate than decoded data in which errors are detected, the decoded data in which errors are detected shows a greater sum-of-product result (likelihood) calculated by sum-of-product calculation section 207.

Thus, this embodiment decides data rates by also including decoded data in which errors are detected as the targets of data rate decision.

Furthermore, the greater the error rate of decoded data, the smaller the sum-of-product result (likelihood) calculated by sum-of-product calculation section 207 becomes. Moreover, it is extremely rare that no error is detected by a CRC carried out by CRC section 203 in decoded data with a high error rate (about once every 1 to 100,000 times CRC is carried out).

Thus, in order to decide whether or not the decoded data is decoded data in which errors are not detected despite the high error rate, this embodiment sets a predetermined threshold in the sum-of-product result (likelihood) so that it is not until the sum-of-product result of the decoded data in which no error is detected does not exceed this predetermined threshold that the decoded data in which some errors are detected is also included in the targets of data rate decision.

Figure 17:
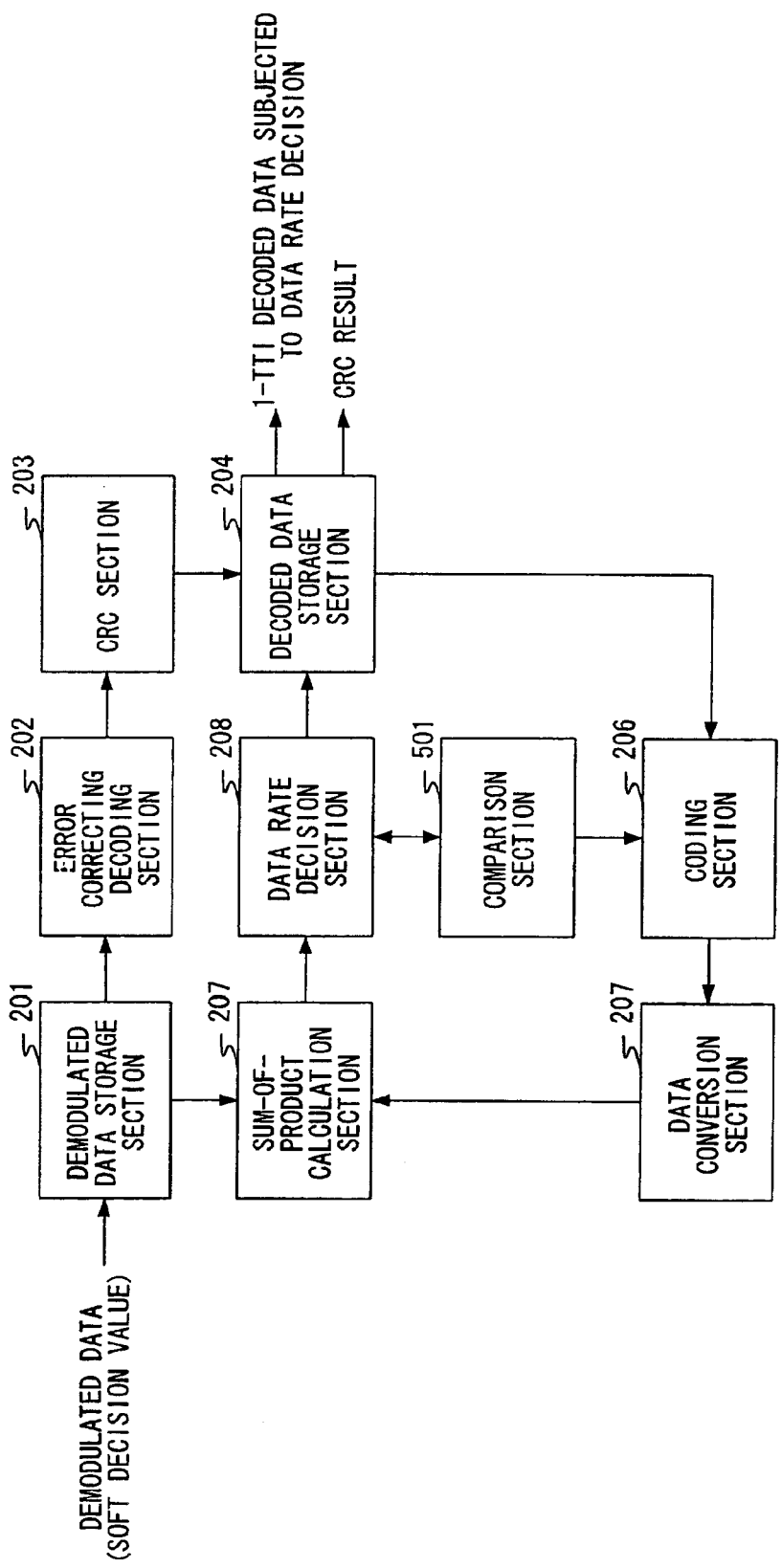
FIG. 17 is a block diagram showing a configuration of a decoding apparatus according to Embodiment 10 of the present invention.

FIG. 17 is a block diagram showing a configuration of a decoding apparatus according to Embodiment 10 of the present invention. As shown in this figure, compared to the decoding apparatus shown in FIG. 14, the decoding apparatus according to this embodiment is constructed by further including comparison section 501 that compares the maximum value of the sum-of-product result detected by data rate decision section 208 with a predetermined threshold. By the way, the same components in FIG. 17 as those in FIG. 14 are assigned the same reference numerals as those in FIG. 14 and detailed explanations thereof will be omitted.

In FIG. 17, CRC section 203 performs error detection on decoded data of M types of data rates in TTI units using error detection codes such as CRC codes added to decoded data. Then, CRC section 203 outputs the 1-TTI decoded data together with data rate information and CRC result (that is, "0" indicating that no error has been detected or "1" indicating that an error has been detected) to decoded data storage section 204. That is, decoded data storage section 204 stores all decoded data of M types of candidate data rates irrespective of whether there is an error or not.

Coding section 205 recodes the decoded data in which no error is detected by CRC section 203 out of the decoded data stored in decoded data storage section 204 first, and then outputs the data to data conversion section 206. Operations of data conversion section 206 and sum-of-product calculation section 207 are the same as those in Embodiment 7. That is, first, a memory in sum-of-product calculation section 207 stores the sum-of-product result calculated from the decoded data in which no error is detected. Data rate decision section 208 detects a maximum sum-of-product result and outputs the maximum value to comparison section 501.

Comparison section 501 compares the maximum value detected by data rate decision section 208 with a predetermined threshold, and when the maximum value exceeds the predetermined threshold, comparison section 501 decides that the CRC result is correct. That is, when the maximum value exceeds the predetermined threshold, comparison section 501 decides that the reliability of CRC is high and there is actually no error in the decoded data in which no error is detected by CRC section 203. Then, comparison section 208 outputs a signal indicating that the maximum value has exceeded the threshold to data rate decision section 208. According to this signal, data rate decision section 208 decides the data rate corresponding to the maximum value as the data rate of the demodulated data and outputs a data rate control signal indicating the decided data rate to decoded data storage section 204.

That is, when the maximum value of the sum-of-product result calculated from the decoded data in which no error is detected exceeds the predetermined threshold, that is, when the reliability of CRC is high, the data rate is decided only targeted at the decoded data in which no error is detected as in the case of Embodiment 7.

On the other hand, when the maximum value of the sum-of-product result calculated from the decoded data in which no error is detected is smaller than the predetermined threshold, that is, when the reliability of CRC is low, comparison section 501 decides that the decoded data corresponding to the maximum value is the decoded data in which no error is detected despite the high error rate. In this case, the data rate is decided by including the decoded data in which errors are detected as the targets of data rate decision.

That is, when the maximum value of the sum-of-product result calculated from the decoded data in which no error is detected is smaller than the predetermined threshold, comparison section 501 instructs coding section 205 to recode the decoded data in which errors are detected by CRC section 203 out of the decoded data stored in decoded data storage section 204. According to this instruction, coding section 205 recodes the decoded data in which errors are detected and outputs to data conversion section 206. Operations of data conversion section 206 and sum-of-product calculation section 207 are the same as those in Embodiment 7. This allows the memory in sum-of-product calculation section 207 to store the sum-of-product calculated from the decoded data in which errors are detected in addition to the sum-of-product result calculated from the decoded data in which no error is detected.

Thus, data rate decision section 208 detects the maximum value of the sum-of-product result again not only targeted at the decoded data in which no error is detected but also targeted at the decoded data in which some errors are detected. Thus, it is not until the sum-of-product result of the decoded data in which no error is detected does not exceed this predetermined threshold that the decoded data in which some errors are detected is also included as the targets for data rate decision.

Then, data rate decision section 208 decides the data rate corresponding to the maximum value as the data rate of the demodulated data as is and outputs a data rate control signal indicating the decided data rate to decoded data storage section 204. That is, when a data rate decision is made not only targeted at the decoded data in which no error is detected but also targeted at the decoded data in which some errors are detected, comparison section 501 does not make any comparison to prevent a case where all sum-of-product results fall below the threshold, making it impossible to decide data rates.

Thus, when the reliability of CRC is low, this embodiment decides the data rate by including the decoded data in which a CRC error is detected as the targets, and therefore this embodiment can decide data rates accurately even if there are errors in the CRC result.

Furthermore, according to this embodiment, it is not until the sum-of-product result of the decoded data in which no error is detected does not exceed a predetermined threshold, that is, the reliability of CRC is low that the decoded data in which some errors are detected is also included as the targets for data rate decision, and therefore it is possible to drastically reduce the amount of processing and power consumption required for data rate decision compared to a case where a data rate decision is made targeted at decoded data with all candidate data rates from the beginning.

By the way, the lower the threshold is set, the higher the probability that a data rate decision will be made only targeted at decoded data in which no error is detected. On the contrary, the higher the threshold is set, the higher the probability that a data rate decision will be made also targeted at decoded data in which errors are detected. Furthermore, when the reliability of CRC is high, it is only necessary to make a data rate decision only targeted at decoded data in which no error is detected. Therefore, to place prime importance on the CRC result, it is desirable to set a lower threshold when the reliability of CRC is higher. On the contrary, to place prime importance on the sum-of-product result (likelihood), it is desirable to set a higher threshold when the reliability of CRC is lower.

(Embodiment 11)

Generally, the better the reception quality of a signal, the lower the bit error rate becomes. Moreover, the lower the bit error rate, the lower the probability that no error will be detected by a CRC despite the presence of errors. That is, the lower the bit error rate, the higher the reliability of CRC. Furthermore, an optimal value of a threshold set in comparison section 501 varies depending on the reliability of CRC. That is, the optimal value of a threshold varies depending on the reception quality of a signal.

Figure 18:
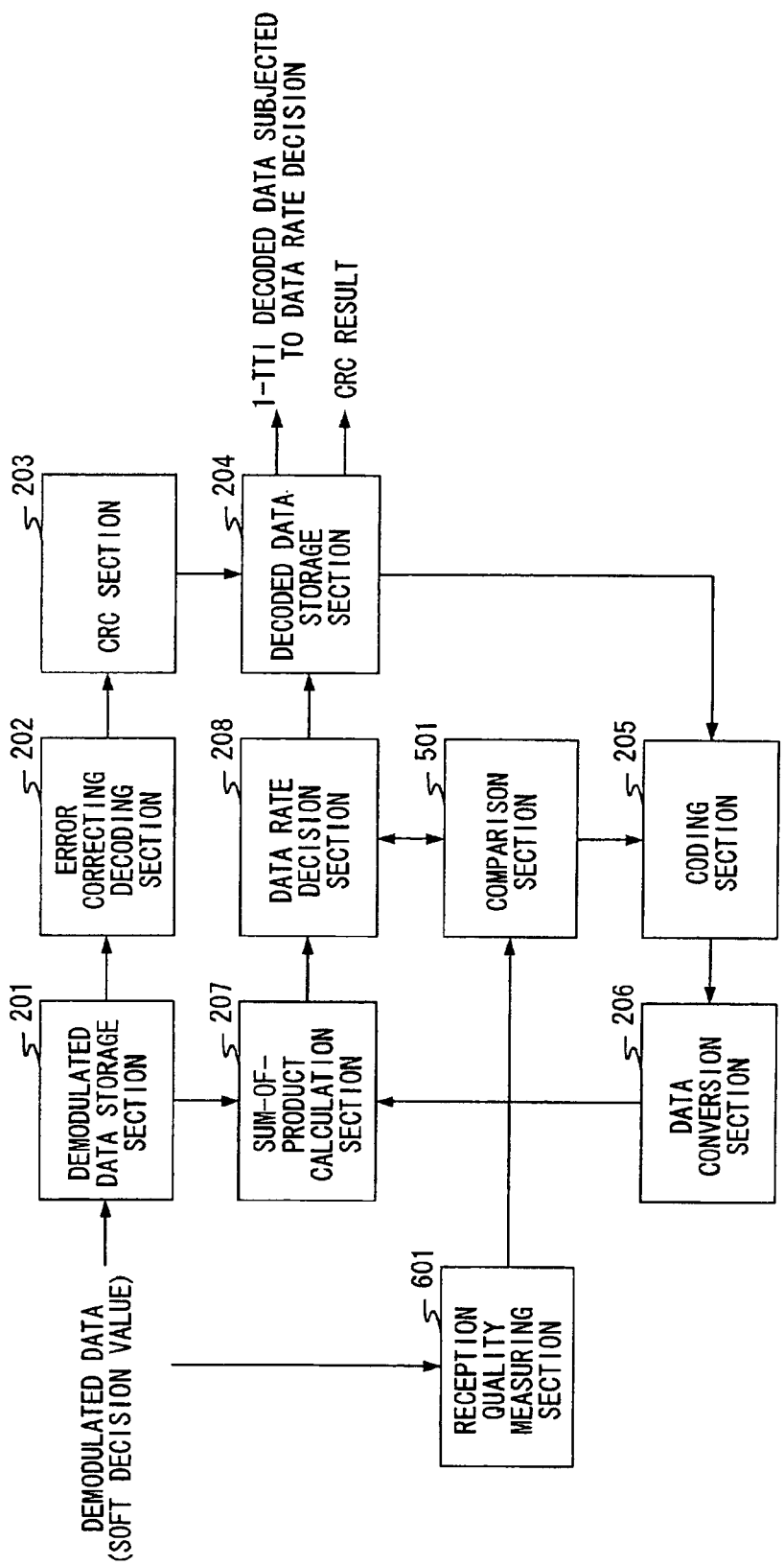
FIG. 18 is a block diagram showing a configuration of a decoding apparatus according to Embodiment 11 of the present invention.

Thus, this embodiment changes a threshold set in comparison section 501 according to the reception quality of a signal. FIG. 18 is a block diagram showing a configuration of a decoding apparatus according to Embodiment 11 of the present invention. As shown in this figure, when compared to the decoding apparatus shown in FIG. 17, the decoding apparatus according to this embodiment is constructed by further including reception quality measuring section 601 that measures the reception quality of demodulated data. The same components in FIG. 18 as those in FIG. 17 are assigned the same reference numerals as those in FIG. 17 and detailed explanations thereof will be omitted.

In FIG. 18, reception quality measuring section 601 measures the reception quality of demodulated data. Here, a case where an SIR (Signal to Interference Ratio) is measured as the reception quality will be explained. Reception quality measuring section 601 outputs a signal indicating the measured SIR to comparison section 501.

Comparison section 501 changes a threshold set in comparison section 501 according to the SIR measured by reception quality measuring section 601. That is, comparison section 501 lowers the threshold for a higher SIR (that is, for higher reception quality). This allows an optimal threshold to be set according to the reception quality, that is, the reliability of CRC.

This embodiment has described the case where an SIR is used as the reception quality, but the method of measuring the reception quality is not limited to a particular one.

Thus, this embodiment adaptively changes the threshold according to the reception quality and can thereby set an optimal threshold according to the reliability of CRC. That is, by setting a lower threshold for higher reliability of CRC, this embodiment can reduce an amount of processing and power consumption required for data rate decision. Furthermore, by setting a higher threshold for lower reliability of CRC, this embodiment can perform data rate decision with primary importance placed on the sum-of-product result (likelihood). That is, even if the reliability of CRC changes with time, this embodiment can make a correct data rate decision with the least amount of processing.

(Embodiment 12)

Here, a method of detecting a reference channel concerning BTFD using restrictions on the BTFD described in the 3GPP standard TS25.212 ver3.4.0 is proposed. This detection apparatus detects a channel that satisfies all the following items (1) to (10) as the reference channel (Explicitly Detected Channel) involved in rate decision. The channel not involved in rate decision is a subordinate channel (Guided Channel) and each subordinate channel is subordinate to some reference channel and the data rate of the subordinate channel is uniquely decided for the reference channel.

(1) There is only one CCTrCH (Coded Composite Transport CHannel).

(2) The number of bits included in CCTrCH is 600 bits or less.

(3) The number of TFCIs (Transport Format Combination Indicators) is 64 or less.

(4) DTX Position must be Fixed Position.

(5) For all reference channels, convolutional coding is used.

(6) CRC exists in all Transport Blocks of all reference channels.

(7) The number of reference channels is 3 or less.

(8) The number of Code Blocks of a reference channel is 1.

(9) The total number of all candidates reference channel data rates (TF: Transport Format) is 16 or less.

(10) For all TrCHs subject to induction decision, there is at least one TrCH used for induction.

However, the above-described 3GPP standard TS25.212 ver3.4.0 has no decision criteria on which channel BTFD is carried out and there is no clear description on an algorithm to decide the subordinate channel that is subordinate to each reference channel when there is a plurality of reference channels. Thus, there is a possibility of erroneously detecting a relationship between a reference channel and subordinate channel which are detected by the decoding apparatus, which is expected to have an influence on the reception performance such as BER (Bit Error Rate) characteristic, etc.

Thus, Embodiment 12 will describe a decoding apparatus and decoding method capable of properly detecting a reference channel and a subordinate channel which is subordinate to each reference channel. To realize this, this embodiment will further narrow down the range of candidate reference channels to which each subordinate channel is subordinate based on candidate data rates of respective channels and the number of candidate data rates and detect a reference channel to which each subordinate channel is subordinate taking into account the TTI involved in the reference channel, the number of candidate data rates (hereinafter referred to as "number of TFs"), TTI of the subordinate channel and the number of TFs.

Figure 19:
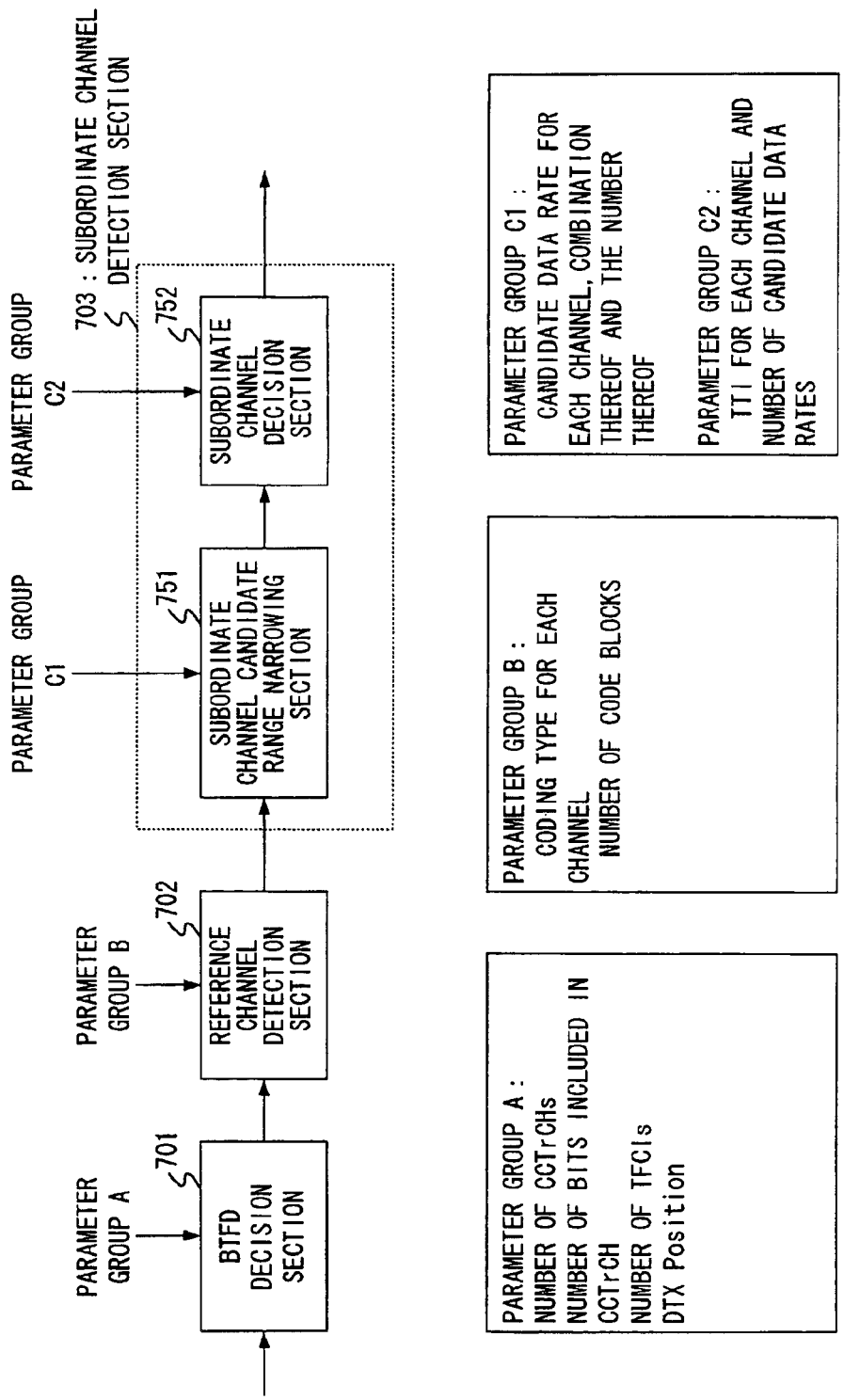
FIG. 19 is a block diagram showing a configuration of a decoding apparatus according to Embodiment 12 of the present invention.

FIG. 19 is a block diagram showing a configuration of a decoding apparatus according to Embodiment 12 of the present invention. The decoding apparatus shown in FIG. 19 is mounted on a communication terminal apparatus such as a cellular phone in a CDMA-based mobile communication system, for example. FIG. 20 illustrates an example of a parameter value of each channel detected by the decoding apparatus according to Embodiment 12 of the present invention.

This embodiment assumes that data sent from the other end of communication is digital data "0" or "1" subjected to error correcting coding with a predetermined code rate and predetermined constraint length, subjected to interleaving processing, and then spread and modulated and converted to "1" or "−1". This embodiment also assumes that the data rate of the data to be sent is one selected from M (M: natural number) types of data rates in TTI units before error correcting coding is carried out on the data.

The decoding apparatus in FIG. 19 is mainly constructed of BTFD decision section 701, reference channel detection section 702 and subordinate channel detection section 703 and subordinate channel detection section 703 includes subordinate channel candidate range narrowing section 751 and subordinate channel decision section 752.

BTFD decision section 701 decides whether it is BTFD or not based on parameter group A made up of the number of CCTrCHs, the number of bits included in CCTrCH, the number of TFCIs and DTX Position and notifies an error correcting decoding apparatus (not shown) of the decision. That is, BTFD decision section 701 decides that BTFD is carried out in the case where (1) to (4) of the restrictions on BTFD described in the 3GPP standard TS25.212 ver3.4.0 apply.

Reference channel detection section 702 detects a reference channel based on parameter group B made up of the type of coding for each channel, the number of CRC bits and the number of code blocks. That is, reference channel detection section 702 detects a channel that meets (5), (6) and (8) of the restrictions on BTFD described in the 3GPP standard TS25.212 ver3.4.0 as the reference channel.

For example, in the case of FIG. 20, since Ch0 and Ch3 meet all the above-described conditions, these are detected as the reference channels, while Ch1 and Ch2 are detected as subordinate channels because no CRC bit exists in ch1 and Ch2.

Subordinate channel candidate range narrowing section 751 of subordinate channel detection section 703 narrows down the range of candidate reference channels to which each subordinate channel is subordinate based on parameter group C1 made up of a candidate data rate for each channel, combination thereof and the number thereof. More specifically, based on the principle that the data rate of a subordinate channel is uniquely determined for a reference channel, if the data rate of a subordinate channel changes while the data rate of the reference channel does not change, a theorem that the relevant subordinate channel is not subordinate to the relevant reference channel is derived, and therefore candidate channels subordinate to a reference channel are detected by a process of elimination applying this theorem.

For example, in FIG. 20, when attention is focused on reference channel Ch0 and subordinate channel Ch1, if the data rate of Ch0 is TF0, the data rate of Ch1 must be TF0 and if the data rate of Ch0 is TF1, the data rate of Ch1 must be TF0, and if the data rate of Ch0 is TF2, the data rate of Ch1 must be TF1. Therefore, there is a possibility that Ch1 may be a channel subordinate to Ch0. Then, when attention is focused on reference channel Ch3 and subordinate channel Ch1, if the data rate of Ch3 is TF0, the data rate of Ch1 may be TF0 or TF1. Therefore, there is no possibility that Ch1 may be subordinate to Ch3.

Thus, by narrowing down the range of candidate reference channels to which each subordinate channel is subordinate beforehand, it is possible to speed up detection of subordinate channels which is subordinate to a reference channel.

Subordinate channel decision section 752 of subordinate channel detection section 703 decides a reference channel to which each subordinate channel is subordinate based on parameter group C2 made up of TTI for each channel and the number of TFs. That is, taking note of the fact that the reference channel and the subordinate channel which is subordinate thereto have the same TTI and that the number of TFs of the reference channel is greater than the number of TFs of the subordinate channels subordinate thereto, subordinate channel decision section 752 decides whether all these conditions are satisfied or not. Then, subordinate channel decision section 752 detects a reference channel that satisfies all the conditions as a channel to which the relevant subordinate channel is subordinate.

For example, when attention is focused on reference channel Ch0 and subordinate channel Ch1 in FIG. 20, both Ch0 and Ch1 have a same TTI of 20 ms. The number of TFs of Ch0 is "3" and the number of TFs of Ch1 is "2", and therefore the condition that the number of TFs of Ch0 is equal to or greater than the number of TFs of Ch1 is satisfied. Therefore, it can be detected that Ch1 is a channel subordinate to Ch0.

Thus, focusing attention on the TTI of each channel and the number of TFs, it is possible to properly detect a reference channel to which each subordinate channel is subordinate.

As is apparent from the above explanations, the present invention can adaptively fit the amplitude width of a data string to be normalized within an effective bit width, improve the data rate decision accuracy, properly detect a reference channel and detect a subordinate channel which is subordinate to each reference channel, thus making it possible to reduce decoding errors.

By the way, it is possible to mount the decoding apparatus according to each of the foregoing embodiments on a base station apparatus or a communication terminal apparatus that communicates with this base station apparatus used in a radio communication system. When mounted, the decoding apparatus can improve the data communication quality and voice quality, etc. in the base station apparatus or communication terminal apparatus. The present invention is not limited to the foregoing embodiments. The foregoing embodiments can be implemented, combined with one another as appropriate.

The decoding apparatus of the present invention adopts a configuration including a reference value calculation section that averages indices of data strings involved in normalization and calculates a reference value, a normalization section that makes a plurality of data strings expressed with different indices have a common index based on the reference value and an error correcting decoding section that carries out error correcting decoding processing on the normalized data string.

The decoding apparatus of the present invention adopts a configuration including a reference shift count calculation section that uses the number of shifts of a data string represented by a power of 2 as an index involved in normalization, averages the number of shifts of the data string and calculates a reference shift count, a normalization section that makes data strings have a common shift count based on the reference shift count and an error correcting decoding section that carries out error correcting decoding processing on the normalized data string.

These configurations allow the amplitude width of a data string to be normalized to be adaptively fitted within an effective bit width, thus preventing extreme underflow from occurring in a high-speed fading environment, making it possible to maintain the likelihood of the data string effectively and improve the error correcting efficiency.

The decoding apparatus of the present invention adopts a configuration wherein the normalization section performs normalization by carrying out a right shift by a value obtained by subtracting the reference shift count from the shift count of the data string.

The decoding apparatus of the present invention adopts a configuration wherein the normalization section performs normalization by carrying out a right shift by a second value obtained by dividing by 2 a first value obtained by subtracting the reference shift count from the shift count of the data string.

The decoding apparatus of the present invention adopts a configuration wherein the normalization section performs normalization by carrying out a right shift by a second value obtained by dividing by 2 the first value obtained by subtracting the reference shift count from the shift count of the data string when the first value is 0 or greater and performs normalization by carrying out a right shift by the first value when the first value is smaller than 0.

The decoding apparatus of the present invention adopts a configuration wherein the normalization section performs normalization without shifting when a first value obtained by subtracting the reference shift count from the shift count of the data string is 0 or greater and performs normalization by carrying out a right shift by a second value obtained by dividing by 2 the first value when the first value is smaller than 0.

The decoding apparatus of the present invention adopts a configuration wherein the normalization section performs normalization by carrying out a right shift by a second value obtained by dividing by 2 a first value obtained by subtracting the reference shift count from the shift count of the data string when the first value is equal to or greater than ½ of a limited bit width and performs normalization by carrying out a right shift by the first value when the first value is smaller than ½ of the limited bit width.

The decoding apparatus of the present invention adopts a configuration wherein the normalization section performs normalization without carrying out a shift when a first value obtained by subtracting the reference shift count from the shift count of the data string is equal to or greater than ½ of a limited bit width and performs normalization by carrying out a right shift by a second value obtained by dividing by 2 the first value when the first value is smaller than ½ of the limited bit width.

These configurations allow normalization processing to be designed in such a way as to avoid underflow and overflow.

The decoding apparatus of the present invention adopts a configuration including a first reference shift count calculation section that uses the number of shifts of a data string represented by a power of 2 as an index involved in normalization, averages the number of shifts of the data string in slot units after RAKE combining and calculates a first reference shift count, a first normalization section that makes data strings in slot units have a common shift count based on the first reference shift count, a second reference shift count calculation section that averages the number of shifts of the data string in frame units output from this first normalization section and calculates a second reference shift count, a second normalization section that makes data strings in frame units have a common shift count based on the second reference shift count and an error correcting decoding section that carries out error correcting decoding processing on the data string output from this second normalization section.

This configuration makes it possible to adaptively fit the amplitude width of the data string to be normalized within an effective bit width, prevent extreme underflow from occurring in a high-speed fading environment, maintain the likelihood of the data string and improve the error correcting efficiency.

The decoding apparatus of the present invention adopts a configuration wherein the first normalization section performs normalization by carrying out a right shift by a value obtained by subtracting the first reference shift count from the shift count of the data string in slot units.

The decoding apparatus of the present invention adopts a configuration wherein the second normalization section performs normalization by carrying out a right shift by a value obtained by subtracting the second reference shift count from the shift count of the data string in frame units.

These configurations allow normalization processing to be designed in such a way as to avoid underflow and overflow.

The program of the present invention implements a reference value calculation function that averages indices of a data string involved in normalization and calculates a reference value, a normalization function that makes a plurality of data strings expressed with different indices have a common index based on the reference value and an error correcting decoding function that carries out error correcting decoding processing on the normalized data string.

The program of the present invention implements a reference shift count calculation function that uses the number of shifts of a data string represented by a power of 2 as an index involved in normalization, averages the number of shifts of the data string and calculates a reference shift count, a normalization function that makes data strings have a common shift count based on the reference shift count and an error correcting decoding function that carries out error correcting decoding processing on the normalized data string.

The program of the present invention implements a first reference shift count calculation function that uses the number of shifts of a data string represented by a power of 2 as an index involved in normalization, averages the number of shifts of a data string in slot units after RAKE combining and calculates a first reference shift count, a first normalization function that makes data strings have a common shift count in slot units based on the first reference shift count, a second reference shift count calculation function that averages the number of shifts of the data string in normalized frame units and calculates a second reference shift count, a second normalization function that makes data strings have a common shift count in frame units based on the second reference shift count and an error correcting decoding function that carries out error correcting decoding processing on the data string over a plurality of normalized frames.

These programs make it possible to adaptively fit the amplitude width of a data string to be normalized within an effective bit width, thus preventing extreme underflow from occurring in a high-speed fading environment, effectively maintaining the likelihood of the data string and improving error correcting efficiency.

The decoding method of the present invention includes a reference value calculating step of averaging indices of a data string involved in normalization and calculating a reference value, a normalization step of making a plurality of data strings expressed with different indices have a common index based on the reference value and an error correcting decoding step of carrying out error correcting decoding processing on the normalized data string.

The decoding method of the present invention includes a reference shift count calculating step of using the number of shifts of a data string represented by a power of 2 as an index involved in normalization, averaging the number of shifts of the data string and calculating a reference shift count, a normalization step of making data strings have a common shift count based on the reference shift count and an error correcting decoding step of carrying out error correcting decoding processing on the normalized data string.

The decoding method of the present invention includes a first reference shift count calculating step of using the number of shifts of a data string represented by a power of 2 as an index involved in normalization, averaging the number of shifts of a data string in slot units after RAKE combining and calculating a first reference shift count, a first normalization step of making data strings have a common shift count in slot units based on the first reference shift count, a second reference shift count calculating step of averaging the number of shifts of a data string in normalized frame units and calculating a second reference shift count, a second normalization step of making data strings have a common shift count in frame units based on the second reference shift count and an error correcting decoding step of carrying out error correcting decoding processing on the data string over a plurality of normalized frames.

These methods make it possible to adaptively fit the amplitude width of a data string to be normalized within an effective bit width, thus preventing extreme underflow from occurring in a high-speed fading environment, effectively maintaining the likelihood of the data string and improving error correcting efficiency.

The decoding apparatus of the present invention adopts a configuration including a decoding section that decodes demodulated data of a soft decision value after demodulation and before decoding at a plurality of types of candidate data rates, a likelihood calculation section that calculates likelihood of the data rate for each data rate using the decoded data decoded by the decoding section and the demodulated data and a decision section that decides the data rate with the highest likelihood as the data rate of the demodulated data.

The decoding apparatus of the present invention adopts a configuration wherein the likelihood calculation section includes a coding section that recodes decoded data, a conversion section that converts the recoded data according to a data conversion performed on the other end of communication and a sum-of-product calculation section that calculates a sum of products of the value of the converted data and the value of the demodulated data and then normalizes the sum-of-product result at the data rate at the time of decoding to calculate likelihood of the data rate.

These configurations calculate likelihood of each data rate using a soft decision value and decoded data and decides the data rate with the highest likelihood as a correct data rate, and can thereby make a decision on data rates with the likelihood of the demodulated data taken into consideration and significantly reduce the probability that the data rate will be decided erroneously.

The decoding apparatus of the present invention adopts a configuration wherein demodulated data is an organizing code made up of an information section and coding section, and the likelihood calculation section includes an extraction section that extracts the information section from the demodulated data, a conversion section that converts the decoded data according to the data conversion performed on the other end of communication and a sum-of-product calculation section that calculates a sum of products of the value of converted data and the value of the information section and then normalizes the sum-of-product result at the data rate at the time of decoding to calculate likelihood of the data rate.

When the demodulated data is an organizing code, this configuration decides the data rate according to the result of a sum of products of the information section extracted from the demodulated data and decoded data which is not subjected to recoding, and therefore this configuration eliminates the need for recoding processing which will result in an extremely large amount of calculation, thus reducing an amount of processing and power consumption required for a data rate decision.

The decoding apparatus of the present invention adopts a configuration including a detection section that detects whether decoded data contains an error or not using an error detection code, wherein the likelihood calculation section and the decision section perform processing only targeted at decoded data in which no error is detected by the detection section.

According to this configuration, decoded data in which errors are detected through error detection is not subjected to data rate decision processing, and therefore it is possible to narrow down the range of candidates data rates before carrying out the data rate decision processing and thereby reduce an amount of processing and power consumption required for data rate decision.

The decoding apparatus of the present invention adopts a configuration including a detection section that detects whether decoded data contains an error or not using an error detection code, wherein when errors are detected in decoded data at all candidate data rates by the detection section, the likelihood calculation section and the decision section perform processing targeted at the decoded data in which errors are detected.

Even when errors are detected in decoded data at all candidate data rates, this configuration decides the most likely data rate using the decoded data in which errors are detected, and therefore it is possible to prevent a data irreproducible period from occurring in a communication (e.g., voice communication) with a certain degree of tolerance for errors of decoded data.

The decoding apparatus of the present invention adopts a configuration including a detection section that detects whether decoded data contains an error or not using an error detection code and a comparison section that compares a maximum value of the likelihood calculated from decoded data in which no error is detected by the detection section with a threshold, wherein when the maximum value is equal to or smaller than the threshold, the likelihood calculation section and decision section perform processing on all decoded data decoded at a plurality of types of candidate data rates.

When the reliability of error detection is low, this configuration decides data rates also including decoded data in which errors are detected, and can thereby decide accurate data rates even if the error detection result contains errors. Moreover, it is not until the reliability of error detection becomes low that decoded data in which errors are detected is also included as the data rate decision targets, and therefore it is possible to drastically reduce an average amount of processing and average power consumption required for data rate decision compared to data rate decision targeted at the decoded data at all candidate data rates from the beginning.

The decoding apparatus of the present invention adopts a configuration wherein the comparison section reduces a threshold as the reception quality of demodulated data improves.

This configuration adaptively changes a threshold according to the reception quality, and can thereby set an optimal threshold according to the reliability of error detection.

The decoding apparatus of the present invention adopts a configuration wherein when the decoding unit includes a plurality of transport blocks, the detection section performs error detection only on the last transport block out of the plurality of transport blocks and when an error is detected in the last transport block, the detection section considers that all decoded data in the decoding unit contains errors.

When error correcting decoding is performed based on a Viterbi algorithm, there is a characteristic that the data in the end section of the data string of the decoding unit has higher decoding accuracy than the data in the leading section, and this embodiment can thereby improve the reliability of error detection. Furthermore, since error detection only needs to be performed on the last transport block, this embodiment can reduce the number of times error detection is performed.

The decoding apparatus of the present invention adopts a configuration wherein when the decoding unit includes a plurality of transport blocks, the detection section considers that all decoded data in the decoding unit contains errors when errors are detected in more than half of the plurality of transport blocks.

According to error detection (CRC) specified by a third-generation mobile communication standard (3GPP), even an error in 1 bit of data contained in a transport block may cause an error to be detected in the transport block or on the contrary, even if most bits contain errors, no error may be detected in the transport block, and therefore this configuration can improve the reliability of error decision.

The decoding apparatus of the present invention adopts a configuration wherein when the decoding unit includes a plurality of transport blocks and the detection section detects errors in more than half of the plurality of transport blocks and detects an error in the last transport block, the detection section considers that all decoded data of the decoding unit contains errors.

When error correcting decoding is performed based on a Viterbi algorithm, this configuration can further improve the reliability of error decision.

The decoding method of the present invention decodes demodulated data of a soft decision value after demodulation and before decoding at a plurality of types of candidate data rates, calculates likelihood of the data rates using the decoded data and the demodulated data for each of the data rates and decides the data rate with the highest likelihood as the data rate of the demodulated data.

This method calculates likelihood of each data rate using a soft decision value and decoded data and decides the data rate with the highest likelihood as a correct data rate, and can thereby decide the data rate with the likelihood of demodulated data taken into consideration and drastically reduce the probability that the data rate will be decided erroneously.

The decoding apparatus of the present invention adopts a configuration when a blind data rate decision is made, including a reference channel detection section that detects a channel that satisfies a predetermined first condition as a reference channel and a subordinate channel detection section that detects a subordinate channel which is subordinate to the reference channel based on a predetermined second condition.

The decoding apparatus of the present invention adopts a configuration wherein the reference channel detection section regards it as a first condition that convolutional coding should be used, CRC bits should exist in all transport blocks and the number of code blocks should be 1.

The decoding apparatus of the present invention adopts a configuration wherein in the subordinate channel detection section, the reference channel and the subordinate channel which is subordinate to the reference channel have the same data transmission length and the number of candidate data rates of the reference channel is equivalent to or greater than the number of candidate data rates of the subordinate channel which is subordinate to the reference channel.

These configurations make it possible to accurately detect a reference channel and a subordinate channel which is subordinate to the reference channel.

The decoding apparatus of the present invention adopts a configuration wherein the subordinate channel detection section narrows down the range of candidate reference channels to which subordinate channels are subordinate for each subordinate channel based on a predetermined third condition and then detects subordinate channels which are subordinate to the reference channel.

The decoding apparatus of the present invention adopts a configuration wherein when the data rate of a subordinate channel changes while the data rate of a reference channel does not change, the subordinate channel detection section regards it as a third condition that the subordinate channel should not be subordinate to the reference channel.

These configurations make it possible to narrow down the range of candidate reference channels to which subordinate channels are subordinate beforehand, thus speeding up detection of subordinate channels which are subordinate to the reference channel.

The decoding method of the present invention adopts a configuration wherein when a blind data rate decision is made, a channel satisfying a predetermined first condition is detected as a reference channel and a subordinate channel which is subordinate to each reference channel is detected based on a predetermined second condition.

This method makes it possible to accurately detect a reference channel and a subordinate channel which is subordinate to each reference channel.

This application is based on the Japanese Patent Application No. 2000-346131 filed on Nov. 14, 2000, the Japanese Patent Application No. 2001-023713 filed on Jan. 31, 2001, the Japanese Patent Application No. 2001-031850 filed on Feb. 8, 2001 and the Japanese Patent Application No. 2001-046559 filed on Feb. 22, 2001, entire content of which is expressly incorporated by reference herein.

Industrial Applicability

The present invention is ideally applicable to a base station apparatus and communication terminal apparatus in a radio communication system.

What is claimed is:

1. A decoding apparatus comprising:
a reference shift count calculation section that uses the number of shifts applied to each of a plurality of data strings, whose values are each represented by a power of 2, as an index involved in normalization, averages the number of shifts applied to the plurality of data strings, and calculates a reference shift count based on the average number of shifts;
a normalization section that performs the normalization by shifting each of the data strings based on the reference shift count so as to provide each of the data strings with a presumptively common exponent; and
an error correcting decoding section that carries out error correcting decoding processing on the normalized data strings.

2. The decoding apparatus according to claim 1, wherein the normalization section performs the normalization on each data string by carrying out a right shift of the data string by a value obtained by subtracting the reference shift count from the shift count corresponding to the data string.

3. The decoding apparatus according to claim 1, wherein the normalization section performs the normalization for each data string by carrying out a right shift of the data string by a second value obtained by dividing by 2 a first value obtained by subtracting the reference shift count from the shift count corresponding to the data string.

4. The decoding apparatus according to claim 1, wherein the normalization section performs the normalization for each data string by carrying out a right shift of the data string by a second value obtained by dividing by 2 a first value obtained by subtracting the reference shift count from the shift count corresponding to the data string when the first value is 0 or greater and performs the normalization by carrying out a right shift by the first value when the first value is smaller than 0.

5. The decoding apparatus according to claim 1, wherein the normalization section performs the normalization for each data string without shifting the data string when a first value obtained by subtracting the reference shift count from the shift count corresponding to the data string is 0 or greater and performs the normalization by carrying out a right shift of the data string by a second value obtained by dividing by 2 the first value when the first value is smaller than 0.

6. The decoding apparatus according to claim 1, wherein the normalization section performs the normalization for each data string by carrying out a right shift of the data string by a second value obtained by dividing by 2 a first value obtained by subtracting the reference shift count from the shift count corresponding to the data string when the first value is equal to or greater than ½ of a limited bit width and performs the normalization by carrying out a right shift of the data string by the first value when the first value is smaller than ½ of the limited bit width.

7. The decoding apparatus according to claim 1, wherein the normalization section performs the normalization for each data string without shifting the data string when a first value obtained by subtracting the reference shift count from the shift count corresponding to the data string is equal to or greater than ½ of a limited bit width and performs the normalization by carrying out a right shift of the data string by a second value obtained by dividing by 2 the first value when the first value is smaller than ½ of the limited bit width.

8. A decoding apparatus comprising:
a first reference shift count calculation section that: (1) uses the number of shifts applied to each of a plurality of data strings, whose values are each represented by a power of 2, as an index involved in normalization, (2) averages the number of shifts, in slot units after RAKE combining, applied to the plurality of data strings, and (3) calculates a first reference shift count based on the average number of slot unit shifts;
a first normalization section that performs first normalization by shifting each of the data strings in slot units based on the first reference shift count so as to provide each of the first normalized data strings with a presumptively common exponent;
a second reference shift count calculation section that averages the number of shifts, in frame units, applied to the first normalized data strings and calculates a second reference shift count based on the average number of frame unit shifts;
a second normalization section that performs second normalization by shifting the first normalized data strings in frame units based on the second reference shift count so as to provide each of the second normalized data strings with a presumptively common exponent; and
an error correcting decoding section that carries out error correcting decoding processing on the second normalized data strings.

9. The decoding apparatus according to claim 8, wherein the first normalization section performs the first normalization by carrying out a right shift of each of the data strings by a value obtained by subtracting the first reference shift count from the corresponding shift count of the data string in slot units.

10. The decoding apparatus according to claim 8, wherein the second normalization section performs the second normalization by carrying out a right shift of each of the first normalized data strings by a value obtained by subtracting the second reference shift count from the shift count of the corresponding first normalized data string in frame units.

11. A program that implements:
a reference shift count calculation function that uses the number of shifts applied to each of a plurality of data strings, whose values are each represented by a power of 2, as an index involved in normalization, averages the number of shifts applied to the plurality of data strings, and calculates a reference shift count based on the average number of shifts;
a normalization function that performs the normalization by shifting each of the data strings based on the reference shift count so as to provide each of the data strings with a presumptively common shift count; and
an error correcting decoding function that carries out error correcting decoding processing on the normalized data strings.

12. A program that implements:
a first reference shift count calculation function that: (1) uses the number of shifts applied to each of a plurality of data strings, whose values are each represented by a power of 2, as an index involved in normalization, (2) averages the number of shifts, in slot units after RAKE combining, applied to the plurality of data strings, and (3) calculates a first reference shift count based on the average number of slot unit shifts;
a first normalization function that performs first normalization by shifting each of the data strings in slot units based on the first reference shift count so as to provide each of the first normalized data strings with a presumptively common shift count;

a second reference shift count calculation function that averages the number of shifts, in frame units, applied to the first normalized data strings and calculates a second reference shift count based on the average number of frame unit shifts;

a second normalization function that performs second normalization by shifting the first normalized data strings in frame units based on the second reference shift count so as to provide each of the second normalized data strings with a presumptively common exponent; and an error correcting decoding function that carries out error correcting decoding processing on the second normalized data strings over a plurality of normalized frames.

13. A decoding method comprising:

using the number of shifts applied to each of a plurality of data strings, whose values are each represented by a power of 2, as an index involved in normalization;

averaging the number of shifts applied to the plurality of data strings;

calculating a reference shift count based on the average number of shifts;

performing the normalization by shifting each of the data strings based on the reference shift count so as to provide each of the data strings with a presumptively common exponent; and carrying out error correcting decoding processing on the normalized data strings.

14. A decoding method comprising:

using the number of shifts applied to each of a plurality of data strings, whose values are each represented by a power of 2, as an index involved in normalization;

averaging the number of shifts, in slot units after RAKE combining, applied to the plurality of data strings;

calculating a first reference shift count based on the average number of slot unit shifts;

performing first normalization by shifting each of the data strings in slot units based on the first reference shift count so as to provide each of the first normalized data strings with a presumptively common shift count;

averaging the number of shifts, in frame units, applied to the first normalized data strings;

calculating a second reference shift count based on the average number of frame unit shifts;

performing second normalization by shifting the first normalized data strings in frame units based on the second reference shift count so as to provide each of the second normalized data strings with a presumptively common exponent; and carrying out error correcting decoding processing on the second normalized data strings over a plurality of normalized frames.

* * * * *